United States Patent
Jeong et al.

(10) Patent No.: US 9,867,010 B2
(45) Date of Patent: Jan. 9, 2018

(54) METHOD, ELECTRONIC DEVICE, AND COMPUTER READABLE RECORDING MEDIUM FOR PROVIDING LOCATION BASED SERVICES

(71) Applicant: Samsung Electronics Co., Ltd, Gyeonggi-do (KR)

(72) Inventors: Jin-Hong Jeong, Gyeonggi-do (KR); Chang-Sook Sung, Gyeonggi-do (KR); Ji-Ryang Chung, Gyeonggi-do (KR); Na-Rae Cho, Seoul (KR); Hyun-Soo Kim, Gyeonggi-do (KR); Ji-Hyun Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 14/106,498

(22) Filed: Dec. 13, 2013

(65) Prior Publication Data

US 2015/0017963 A1 Jan. 15, 2015

(30) Foreign Application Priority Data

Jul. 10, 2013 (KR) ........................ 10-2013-0081041

(51) Int. Cl.
*H04W 4/02* (2009.01)
*H04M 3/00* (2006.01)

(52) U.S. Cl.
CPC ............. *H04W 4/025* (2013.01); *H04W 4/02* (2013.01)

(58) Field of Classification Search
CPC ...................................................... H04W 4/02

USPC ................................................... 455/418, 456
See application file for complete search history.

(56) References Cited

U.S. PATENT DOCUMENTS

| | | | |
|---|---|---|---|
| 6,721,542 B1* | 4/2004 | Anttila | G06Q 20/32 455/456.1 |
| 7,190,949 B2* | 3/2007 | Tsuda | G06F 9/445 455/410 |
| 7,200,387 B1* | 4/2007 | Ephraim | H04M 1/72572 455/404.2 |
| 2003/0228866 A1* | 12/2003 | Pezeshki | H04L 67/04 455/422.1 |
| 2004/0090930 A1 | 5/2004 | Lee et al. | |
| 2004/0203863 A1 | 10/2004 | Huomo | |
| 2009/0059849 A1* | 3/2009 | Namba | H04L 1/1825 370/328 |
| 2009/0164480 A1* | 6/2009 | Lappetelainen | G06F 8/65 |
| 2010/0273450 A1* | 10/2010 | Papineau | G06F 8/60 455/411 |

FOREIGN PATENT DOCUMENTS

| | | |
|---|---|---|
| KR | 10-2004-0042247 | 5/2004 |
| KR | 10-2006-0027588 | 3/2006 |

* cited by examiner

*Primary Examiner* — William Nealon

(57) ABSTRACT

An electronic device provides location-based services. The electronic device may include a communication module configured to receive information on a wireless network device, including identification information of at least one electronic device, from the wireless network device. The electronic device may also include a controller configured to perform at least some functions of the electronic device, based on at least one piece of action information corresponding to the identification information, when the identification information corresponding to the electronic device is included in the received information.

20 Claims, 16 Drawing Sheets

| FIRST IDENTIFICATION INFORMATION OF ELECTRONIC DEVICE | SECOND IDENTIFICATION INFORMATION OF ELECTRONIC DEVICE |
|---|---|

FIG.8A

| FIRST IDENTIFICATION INFORMATION OF ELECTRONIC DEVICE | FIRST ACTION INFORMATION | SECOND IDENTIFICATION INFORMATION OF ELECTRONIC DEVICE | SECOND ACTION INFORMATION |
|---|---|---|---|

FIG.8B

| IDENTIFICATION INFORMATION OF ELECTRONIC DEVICE | FIRST ACTION INFORMATION | SECOND ACTION INFORMATION |
|---|---|---|

FIG.8C

| SYNTHESIZED INFORMATION OF ELECTRONIC DEVICE |
|---|

FIG.8D

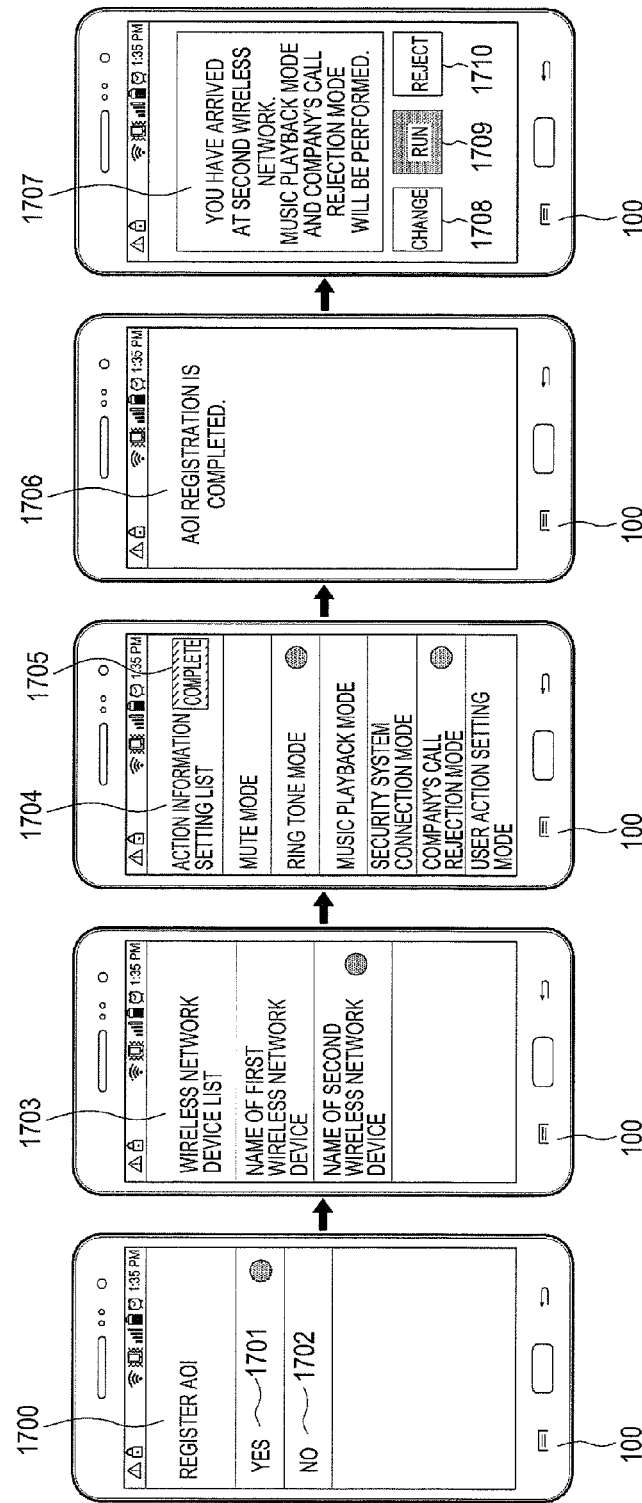

METHOD, ELECTRONIC DEVICE, AND COMPUTER READABLE RECORDING MEDIUM FOR PROVIDING LOCATION BASED SERVICES

CROSS-REFERENCE TO RELATED APPLICATION(S) AND CLAIM OF PRIORITY

The present application is related to and claims the priority under 35 U.S.C. §119(a) to Korean Application Serial No. 10-2013-0081041, which was filed in the Korean Intellectual Property Office on Jul. 10, 2013, the entire content of which is hereby incorporated by reference.

TECHNICAL FIELD

The present disclosure relates to an electronic device for providing location based services, and more particularly to, a method, electronic device, and computer readable recording medium for providing location based services by using identification information.

BACKGROUND

Location-based services (LBS) is one of a number of technical fields that are being actively developed in the global mobile communication market, and increasing attention is paid to the LBS as the level of infrastructure construction is raised.

LBS-related technologies include positioning technology for measuring and determining the position of an electronic device, platform technology for the LBS, information providing service technology for providing a mobile device with information, and the like.

In many systems that use LBS, an electronic device is connected to a wireless network device for communication. Subsequently, the electronic device receives information transmitted from the wireless network device. Accordingly, a user of the electronic device is unilaterally provided with location information transmitted from the wireless network device. As an example, the electronic device may determine its location by using information received from the global positioning system (GPS) or by using information received from a base station (BS) of the cellular network to perform triangulation.

SUMMARY

To address the above-discussed deficiencies, it is a primary object to provide a method, electronic device, and computer readable recording medium for providing LBS, which can distinguish between a plurality of electronic devices using location information providing services.

Another aspect of the present disclosure is to provide a method, electronic device, and computer readable recording medium for providing LBS, which can provide a plurality of electronic devices using location information providing services with an information set for each of the electronic devices.

Yet another aspect of the present disclosure is to provide a method, electronic device, and computer readable recording medium for providing LBS, which can distinguish between a plurality of electronic devices and provide the electronic devices with an information set for each of the electronic devices when the plurality of electronic devices enter a location information providing service area.

In accordance with an aspect of the present disclosure, a method of providing location-based services (LBS) by using an electronic device is provided. The method may include receiving information on a wireless network device from the wireless network device; determining if identification information corresponding to the electronic device is included in the received information; and in response to determining that the identification information is included in the received information, performing at least some functions of the electronic device, based on at least one piece of action information corresponding to the identification information.

The performing of the at least some functions of the electronic device may include performing at least some predetermined functions of the electronic device, corresponding to the identification information.

In the determining if the identification information corresponding to the electronic device is included in the received information, at least one of a serial number, media access control (MAC) address, universally administered address (UAA), locally administered address (LAA), Internet protocol (IP) address, international mobile equipment identity (IMEI), international mobile station identity (IMSI), temporary mobile subscriber identity (TMSI), mobile identification number (MIN), mobile station international subscriber directory number (MSISDN), single sign on ID, and personal identification number (PIN) of the electronic device may be used as the identification information of the electronic device, or identification information newly generated based on at least one thereof may be used as the identification information of the electronic device.

The performing of the at least some functions of the electronic device may include performing the at least some functions of the electronic device, based on the at least one piece of action information included in the received information.

The performing of the at least some functions of the electronic device may include generating the identification information and action information corresponding to each of the identification information into one message by using at least one of a bit operation, a simple operation, encoding, and compression.

The determining if the identification information corresponding to the electronic device is included in the received information may include determining if the identification information corresponding to a plurality of electronic devices is included in the received information.

The method may further include one of: transmitting the identification of the electronic device to the wireless network device; and transmitting the at least one piece of action information, mapped to the identification information of the electronic device, to the wireless network device.

In accordance with another aspect of the present disclosure, a method of providing location-based services (LBS) is provided. The method may include receiving identification information of an electronic device by a wireless network device; generating information on the wireless network device, the generated information including the identification information of the electronic device; and transmitting the generated information to the electronic device.

The receiving of the identification information of the electronic device may include receiving the identification information of the electronic device from another wireless network device in which the identification information of the electronic device is stored, receiving the identification information of the electronic device directly from the electronic device, or receiving the identification information of the electronic device from any one of a plurality of electronic devices using single sign on.

The generating of the information on the wireless device may include generating the information on the wireless device, based on the identification information of the electronic device; or generating the information on the wireless device, based on the identification information of the electronic device and at least one piece of action information mapped to the identification information of the electronic device.

In accordance with yet another aspect of the present disclosure, a non-transitory computer readable medium is provided.

The computer recording medium is encoded with computer-executable instructions that when executed cause a processor to receive information on a wireless network device from the wireless network device; determine if identification information corresponding to the electronic device is included in the received information; and in response to a determination that the identification information is included in the received information, perform at least some functions of the electronic device, based on at least one piece of action information corresponding to the identification information.

In accordance with still yet another aspect of the present disclosure, a non-transitory computer readable medium is provided. The computer readable medium is encoded with computer-executable instructions that when executed cause a processor to receive identification information of an electronic device by a wireless network device; generate information on the wireless network device, the generated information including the identification information of the electronic device; and transmit the generated information to the electronic device.

In accordance with still yet another aspect of the present disclosure, an electronic device for providing location-based services (LBS) is provided. The electronic device may include a communication module configured to receive information on a wireless network device, including identification information of at least one electronic device, from the wireless network device; and a controller configured to perform at least some functions of the electronic device, based on at least one piece of action information corresponding to the identification information, when the identification information is included in the received information.

The controller may be configured to use at least one of a serial number, media access control (MAC) address, universally administered address (UAA), locally administered address (LAA), Internet protocol (IP) address, international mobile equipment identity (IMEI), international mobile station identity (IMSI), temporary mobile subscriber identity (TMSI), mobile identification number (MIN), mobile station international subscriber directory number (MSISDN), single sign on ID, and personal identification number (PIN) of the electronic device as the identification information of the electronic device, or use identification information newly generated based on at least one thereof as the identification information of the electronic device.

The at least some functions of the electronic device may include at least one of application execution, application termination, changes in settings of the electronic device, user interface changes, screen switching, interruption of a specific function of the electronic device, message forwarding, message reception, and alert message popup window display.

The controller may be configured to transmit at least one of the identification information of the electronic device and the at least one piece of action information to the wireless network device.

The information on the wireless network device may include the identification information of the electronic device or include the identification information of the electronic device and the at least one piece of action information mapped to the identification information of the electronic device.

The electronic device may further include a memory configured to store the identification information or store the identification information and the at least one piece of action information mapped to the identification information.

The identification information may be shared among a plurality of electronic devices or correspond to each of the identification information of the plurality of electronic devices.

The controller may be configured to transmit the identification information of the electronic device to the wireless network device or transmit the identification information of the electronic device and the at least one piece of action information, mapped to the identification information of the electronic device, to the wireless network device, based on a user input.

The recording medium includes all types of recording media that store programs and data readable by a computer system. Examples of the recording media include a read only memory (ROM), a random access memory (RAM), a compact disk (CD), a digital video disk (DVD)-ROM, a magnetic tape, a floppy disk, an optical data storage device, an embedded multimedia card (eMMC) and the like, and also include something implemented in a form of carrier wave (e.g., transmission through Internet). Further, the recording media may store and execute codes distributed to a computer system connected through a network and readable by a computer in a distributed manner.

According to embodiments of the present disclosure, unnecessary information may be interrupted because before a user is provided with LBS, an electronic device determines if the unique identification information of the electronic device is included in information received from a wireless network device.

Further, according to embodiments of the present disclosure, when the result of the determination shows that the identification information of the electronic device is included in the received information, the electronic device may extract action information mapped to the identification information from the information received from the wireless network device or its memory, and perform a predetermined function, based on the extracted action information.

Further, according to embodiments of the present disclosure, it is possible to distinguish between a plurality of electronic devices and provide the respective electronic devices with different location-based services (LBS) even when the plurality of electronic devices are located in the LBS area.

Further, according to embodiments of the present disclosure, a user may set a plurality of electronic devices in such a manner as to use one piece of identification information. When at least one of the plurality of electronic devices, which are set by the user in such a manner as to use one piece of identification information, enter the LBS area, it may be provided with the LBS set by the user.

Further, according to embodiments of the present disclosure, at least one piece of action information mapped to the identification information may be predetermined by the user.

The electronic device may perform a predetermined function, based on the action information.

Before undertaking the DETAILED DESCRIPTION below, it may be advantageous to set forth definitions of certain words and phrases used throughout this patent document: the teens "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A through 8D illustrate examples of a configuration of information that is transmitted from an electronic device to a wireless network device according to an embodiment of the present disclosure;

FIGS. 17A through 17E illustrate examples of utilizing a method of providing LBS by using identification information according to an embodiment of the present disclosure.

DETAILED DESCRIPTION

Figure 1:
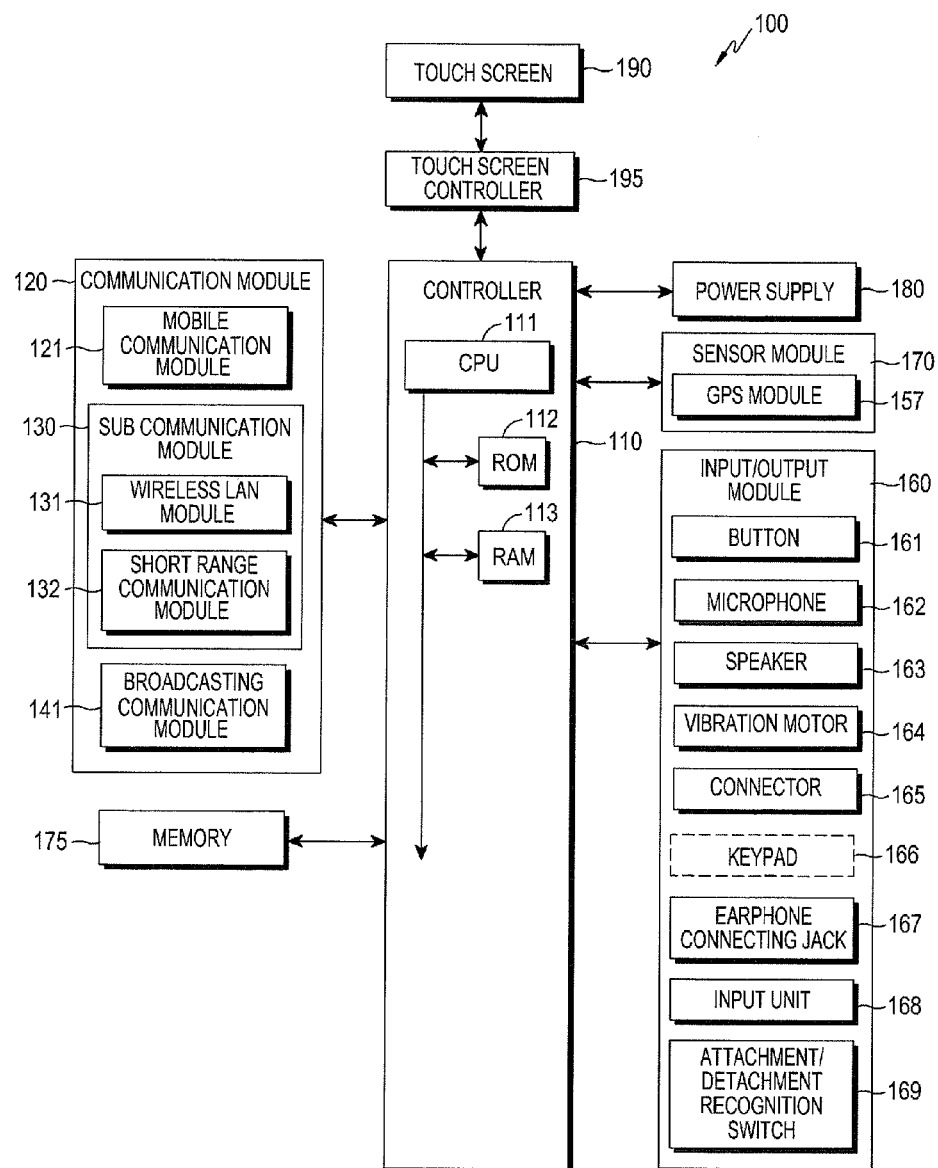
FIG. 1 illustrates an electronic device according to an embodiment of the present disclosure.

FIGS. 1 through 17E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Hereinafter, embodiments of the present disclosure will be described in detail with reference to the accompanying drawings. The embodiments will be sufficiently described in detail such that those skilled in the art may carry out the present disclosure. It should be understood that although various embodiments of the present disclosure are different from each other, they need not be mutually exclusive. For example, in regard to an embodiment, specific forms, structures, and characteristics described herein may be realized through another embodiment without departing from the spirit and scope of the present disclosure. Moreover, it should be understood that locations or arrangements of separate elements within the disclosed embodiments can be changed without departing from the spirit and scope of the present disclosure. Accordingly, detailed descriptions which will be given below are not intended to be restrictive, and the scope of the present disclosure, if properly described, should be limited only by the accompanying claims and equivalents thereof.

While terms including ordinal numbers, such as "first" and "second," etc., may be used to describe various components, such components are not limited by the above terms. The above terms are used only to distinguish one component from another. For example, a first component may be referred to as a second component without departing from the scope of the present disclosure, and likewise a second component may be referred to as a first component. The term "and/or" encompasses a combination of plural items or any one of the plural items.

The terms used herein are merely used to describe specific embodiments, and are not intended to limit the present disclosure. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an embodiment of the present disclosure, in order for an electronic device to provide a user with location-based services (LBS), it transmits its identification information to a wireless network device installed within an LBS area. The identification information transmitted by the electronic device is stored in the wireless network device. When the electronic device transmits its identification information, action information mapped to the identification information may be transmitted together. In this case, the identification information and the action information mapped to the identification information, transmitted by the electronic device, may be stored in the wireless network device.

According to an embodiment of the present disclosure, an electronic device may generate at least one piece of identification information. The identification information generated by the electronic device may be mapped to at least one piece of action information. As an example, the electronic device may generate one piece of identification information mapped to a plurality of pieces of action information, and may also generate one piece of identification information for each action information.

According to an embodiment of the present disclosure, action information may be information for performing at least one function or executing at least one application that is predetermined by a user in an electronic device.

According to an embodiment of the present disclosure, when a plurality of pieces of action information are mapped to identification information, each action information may include different information. As an example, first action information may be information for performing a first function or executing a first application that is predetermined by a user in an electronic device, and second action information may be information for performing a second function or executing a second application that is predetermined by the user in the electronic device.

According to an embodiment of the present disclosure, an electronic device may generate identification information and at least one piece of action information mapped to the identification information in formats independent of each other. As an example, an electronic device may generate identification information and action information in distinguishable formats respectively, and transmit the generated identification information and action information to a wireless network device.

According to an embodiment of the present disclosure, an electronic device may generate identification information and action information respectively, process the generated identification information and action information into one format, and then transmit the processed identification information and action information to a wireless network device.

According to an embodiment of the present disclosure, a wireless network device may generate identification information and at least one piece of action information mapped to the identification information in various formats, and transmit the generated identification information and action information to an electronic device again. As an example, a wireless network device may generate identification information and action information in distinguishable formats respectively, and transmit the generated identification information and action information to an electronic device.

According to an embodiment of the present disclosure, a wireless network device may generate identification information and action information respectively, process the generated identification information and action information into one format, and then transmit the processed identification information and action information to an electronic device.

According to an embodiment of the present disclosure, identification information and at least one piece of action information mapped to the identification information may be generated by an electronic device and stored in a memory of the electronic device. Identification information and at least one piece of action information mapped to the identification information, which are transmitted from an electronic device to a wireless network device, may be stored in a memory of the wireless network device. As an example, when an electronic device transmits identification information to a wireless network device, the wireless network device may store the received identification information in its memory. Further, when an electronic device transmits identification information together with at least one piece of action information mapped to the identification information to a wireless network device, the wireless network device may store the received identification information and action information mapped to the identification information in its memory.

According to an embodiment of the present disclosure, an electronic device for providing LBS by using identification information may initiate operations of the LBS when it enters the LBS area. The electronic device may receive information on a wireless network device, located in the LBS area, from the wireless network device. The received information on the wireless network device includes identification information of at least one electronic device. The electronic device may determine if identification information transmitted from the electronic device to the wireless network device is included in the received information on the wireless network device. When the result of the determination shows that identification information transmitted from the electronic device to the wireless network device is included in the received information on the wireless network device, the electronic device may extract action information mapped to the corresponding identification information from its memory or the received information on the wireless network device. The received information on the wireless network device may include not only identification information of at least one electronic device, but also action information mapped to the identification information of the electronic device. The electronic device may perform a predetermined function, based on the extracted action information.

According to an embodiment of the present disclosure, an electronic device may determine whether to extract at least one piece of action information mapped to identification information from its memory or received information on a wireless network device, according to priority set by a user.

As an example, an electronic device may extract action information with higher priority among action information stored in its memory and action information included in received information on a wireless network device, and perform a predetermined function, based on the extracted action information. In order to facilitate the understanding of the present disclosure, it is assumed that action information stored in an electronic device has higher priority than action information stored in a wireless network device.

According to an embodiment of the present disclosure, a computer readable recording medium recording a program includes all types of recording media that store programs and data readable by a computer system. Examples of the recording media include a read only memory (ROM), a random access memory (RAM), a compact disk (CD), a digital video disk (DVD)-ROM, a magnetic tape, a floppy disk, an optical data storage device, an embedded multimedia card (eMMC) and the like, and also include something implemented in a form of carrier wave (for example, transmission through Internet). Further, the recording media may store and execute codes distributed to a computer system connected through a network and readable by a computer in a distributed manner.

According to an embodiment of the present disclosure, an electronic device may be any type of electronic device, and examples of the electronic device may include a smart phone, a mobile phone, a gaming machine, a display, a vehicle head up display unit, a notebook, a laptop, a tablet, a personal media player (PMP), a personal digital assistant (PDA), a navigation unit, and the like. The electronic device may be implemented as a portable handheld communication device with wireless communication functionality. Further, the electronic device may be a flexible device or a flexible display device.

FIG. 1 illustrates an electronic device according to an embodiment of the present disclosure.

Referring to FIG. 1, the electronic device 100 may include a controller 110, a communication module 120, an input/output module 160, a sensor module 170, a memory 175, a power supply 180, a touch screen 190, and a touch screen controller 195.

The controller 110 includes a CPU 111, a ROM 112 for storing a control program for controlling the electronic device 100, and a RAM 113 used as a memory area for storing a signal or data input from the outside of the electronic device 100 or for tasks performed in the electronic device 100. The CPU 111 includes a multi-core, such as a single core, a dual core, a triple core, or a quadruple core. The CPU 111, the ROM 112, and the RAM 113 may be connected to each other through an internal bus.

The controller 110 may control the communication module 120, the input/output module 160, the sensor module 170, the memory 175, the power supply 180, the touch screen 190, and the touch screen controller 195.

The controller 110 may perform control such that the electronic device 100 receives information on a wireless network device (not shown) from the wireless network device through the communication module 120. The controller 110 may determine if identification information transmitted by the electronic device 100 is included in the received information on the wireless network device. When the result of the determination shows that identification information transmitted by the electronic device 100 is included in the received information on the wireless network device, the controller 110 may extract at least one piece of action information mapped to the corresponding identification information from the memory 175 or the received information on the wireless network device. The controller 110 may perform control such that the electronic device 100 performs a predetermined function, based on the extracted at least one piece of action information. The predetermined function may be set by a user. A detailed configuration of the controller 110 according to an embodiment of the present disclosure will be described in detail below with reference to FIG. 3.

Further, the controller 110 may detect a user input event, such as a touch event in which an input unit 168 touches the touch screen 190 or a hovering event in which the input unit 168 is located in close proximity to the touch screen 190.

Further, the controller 110 may detect various user inputs received through a camera module (not shown), the input/output module 160, and the sensor module 170, as well as the touch screen 190. The user input may include various types of information input into the electronic device 100, such as a user's gesture, voice, pupil movement, iris pattern, and bio-signal. The controller 110 may perform control such that a predetermined step or function corresponding to the detected user input is performed in the electronic device 100.

The controller 110 may output a control signal to the input unit 168 or an oscillator 164. Such a control signal may include information on a vibration pattern, and the input unit 168 or the oscillator 164 generates a vibration according to the vibration pattern. The information on the vibration pattern may indicate the vibration pattern itself or an indicator of the vibration pattern. Alternatively, the control signal may include only a request for oscillation.

The communication module 120 includes a mobile communication module 121, a sub communication module 130, and a broadcasting communication module 141. The sub communication module 130 includes at least one of a wireless LAN module 131 and a short range communication module 132.

Under the control of the controller 110, the mobile communication module 121 may allow the electronic device 100 to be connected to another external electronic device (not shown) via a mobile communication network by using at least one or a plurality of antennas.

Further, the mobile communication module 121 may allow the electronic device 100 to transmit/receive a wireless signal for a voice call, video call, short message service (SMS), or multimedia message service (MMS) to/from another electronic device with mobile communication functionality.

The sub communication module 130 may include at least one of the wireless LAN module 131 and the short range communication module 132. As an example, the sub communication module 130 may include only the wireless LAN module 131, only the short range communication module 132, or both the wireless LAN module 131 and the short range communication module 132.

Under the control of the controller 110, the wireless LAN module 131 may be connected to the Internet in a place where a wireless access point (AP) (not shown) is installed. The wireless LAN module 131 may support the wireless LAN standard (IEEE802.11x) of the IEEE (Institute of Electrical and Electronics Engineers).

Under the control of the controller 110, the short range communication module 132 may perform short range wireless communication between the electronic device 100 and an external electronic device (not shown). The short range wireless communication may include Bluetooth, infrared data association (IrDA), near field communication (NFC), visible light communication, and the like.

Under the control of the controller 110, the broadcasting communication module 141 may receive a broadcasting signal (e.g., a TV broadcasting signal, a radio broadcasting signal, or a data broadcasting signal) and broadcasting supplement information (e.g., electric program guide (EPG) or electric service guide (ESG)), transmitted from a broadcasting station, through a broadcasting communication antenna (not shown).

The input/output module 160 may include at least one button 161, at least one microphone 162, at least one speaker 163, at least one oscillator 164, a connector 165, a keypad 166, an earphone connection jack 167, and the input unit 168. The input/output module 160 is not limited thereto, and a mouse, a trackball, a joystick, or a cursor control such as cursor direction keys may be provided to control movements of a cursor on the touch screen 190.

The button 161 may be formed on the front surface, side surface, or back surface of the housing of the electronic device 100, and may include at least one of a power/lock button, a volume button, a menu button, a home button, a back button, and a search button.

Under the control of the controller 110, the microphone 162 may receive a voice or sound and generate the received voice or sound into an electrical signal.

Under the control of the controller 110, the speaker 163 may output sounds corresponding to various signals or data (e.g., wireless data, broadcasting data, digital audio data, digital video data, etc.) to the outside of the electronic device 100. The speaker 163 may output a sound (e.g., a button operation tone, a ring back tone, and a counterpart user's voice corresponding to a phone call) corresponding to a function that is performed by the electronic device 100. One or more speakers 163 may be formed in an appropriate position or appropriate positions of the housing of the electronic device 100.

Under the control of the controller 110, the oscillator 164 may convert an electrical signal to a mechanical vibration. As an example, when the electronic device 100 that is in a vibration mode receives a voice or video call from another device (not shown), the oscillator 164 is operated. One or more oscillators 164 may be formed within the housing of the electronic device 100. The oscillator 164 may be operated in correspondence with a user input received through the touch screen 190.

The connector 165 may be used as an interface for connecting the electronic device 100 to an external electronic device or power source. The controller 110 may transmit data stored in the memory 175 of the electronic device 100 to an external electronic device or receive data from an external electronic device through a wired cable connected to the connector 165. The electronic device 100 may receive power from a power source or charge a battery by using a power source through a wired cable connected to the connector 165.

The keypad 166 may receive a key input for the control of the electronic device 100 from a user. The keypad 166 may include a physical keypad formed in the electronic device 100 or a virtual keypad displayed on the touch screen 190. The physical keypad formed in the electronic device 100 may be omitted according to the capability or structure of the electronic device 100.

An earphone may be inserted into the earphone connection jack 167 to be connected to the electronic device 100.

The input unit 168 may be inserted into the housing of the electronic device 100 when being safely kept, and may be withdrawn or separated from the electronic device 100 when being used. An attachment/detachment recognition switch 169 which is operated in correspondence with attachment/detachment of the input unit 168 is located in an area within the electronic device 100, into which the input unit 168 is inserted, and the attachment/detachment recognition switch 169 may output signals corresponding to the mounting and separation of the input unit 168 to the controller 110. The attachment/detachment recognition switch 169 may be configured in such a manner as to directly/indirectly come into contact with the input unit 168 when the input unit 168 is mounted. Accordingly, the attachment/detachment recognition switch 169 may generate a signal corresponding to the mounting or separation of the input unit 168 (e.g., a signal informing the electronic device 100 of the mounting or separation of the input unit 168) and output the generated signal to the controller 110, based on whether or not the attachment/detachment recognition switch 169 comes into contact with the input unit 168.

According to an embodiment of the present disclosure, the electronic device 100 may be connected to an external electronic device by using at least one of the communication module 120, the connector 165, and the earphone connection jack. The external electronic device includes one of various devices such as an earphone, an external speaker, a universal serial bus (USB) memory, a charger, a cradle/dock, a DMB antenna, a mobile payment-related device, a health management device (a blood glucose meter or the like), a gaming machine, a vehicle navigation unit, and the like which may be attached to the electronic device 100 and connected to the electronic device 100 by cable. Further, the external electronic device includes a Bluetooth communication device, a near field communication (NFC) device, a WiFi direct communication device, and a wireless access point (AC) to which the electronic device 100 may be wirelessly connected. Further, the electronic device 100 may be connected to another portable user device or another electronic device, for example, a mobile phone, a smart phone, a tablet PC, a desktop PC, and a server.

According to an embodiment of the present disclosure, a user input that the electronic device 100 receives may include a gesture input through the camera module (not shown), a switch/button input through the button 161 or the keypad 166, and a voice input through the microphone 162, as well as a user input through the touch screen 190.

The sensor module 170 may include at least one sensor for detecting a state of the electronic device 100. As an example, the sensor module 170 may include at least one of a proximity sensor for detecting whether a user approaches the electronic device 100, a light sensor for detecting the intensity of ambient light of the electronic device 100, a motion sensor for detecting a motion (e.g., rotation, acceleration, or vibration of the electronic device 100) of the electronic device 100, a geo-magnetic sensor for detecting the point of the compass of the electronic device 100 by using the Earth's magnetic field, a gravity sensor for detecting the direction of gravity action, an altimeter for measuring an atmospheric pressure to detect an altitude, and a GPS module 157.

The GPS module 157 may receive radio waves from a plurality of GPS satellites on Earth orbits, and calculate a position of the electronic device 100 by using the times of arrival of the radio waves from the satellites to the electronic device 100.

Under the control of the controller 110, the memory 175 may store a signal or data input/output according to the operation of the communication module 120, the multimedia module 140, the camera module 150, the input/output module 160, the sensor module 170, or the touch screen 190. The storage unit 175 may store control programs and applications for controlling the electronic device 100 or the controller 110.

The term "memory" is used as a term which refers to any type of data storage device such as the ROM 112 or the RAM 113 within the controller 110, or a memory card (e.g., an SD card or a memory stick) mounted in the electronic device 100. The memory 175 may include a non-volatile memory, a volatile memory, a hard disk drive (HDD), or a solid state disk (SSD).

Further, the memory 175 may store images for providing applications having various functions, such as navigation, video communication, gaming, and alarming for a user, and graphical user interfaces (GUIs) related thereto, databases or data related to processing of user information, documents, and touch inputs, background images (menu screens, standby screens, etc.) or operating programs necessary for driving the electronic device 100, images photographed by the camera module (not shown), and the like.

Further, the memory 175 may store at least one piece of identification information of the electronic device 100.

Further, the memory 175 may store the identification information and at least one piece of action information mapped to the identification information in a table format. As an example, the memory 175 may store identification information and at least one piece of action information in which one piece of action information is mapped to each piece of identification information, or may store identification information and at least one piece of action information in which a plurality of pieces of action information are mapped to each piece of identification information.

The memory 175 is a machine (e.g., computer)-readable medium, and the term "the machine-readable medium" may be defined as a medium for providing data to a machine so as for the machine to perform a specific function. The memory 175 may include a non-volatile medium and a volatile medium. All such media should be of a type in which commands transferred by the media can be detected by a physical mechanism reading the commands into a machine.

The machine-readable medium may include, but not limited to, at least one of a floppy disk, a flexible disk, a hard disk, a magnetic tape, a compact disk read-only memory (CD-ROM), an optical disk, a punch card, a paper tape, a random access memory (RAM), a programmable read-only memory (PROM), an erasable PROM (EPROM), a flash-EPROM, and an embedded multimedia card (eMMC).

Under the control of the controller 110, the power supply 180 may supply power to one battery or a plurality of batteries disposed in the housing of the electronic device 100. The one battery or the plurality of batteries supply power to the electronic device 100.

Further, the power supply 180 may supply power, input from an external power source through a wired cable connected to the connector 165, to the electronic device 100. Further, the power supply 180 may supply power, wirelessly input from an external power source through a wireless charging technology, to the electronic device 100.

The electronic device 100 includes at least one touch screen 190 for providing a user with user graphical interfaces corresponding to various services (e.g., a phone call, data transmission, broadcasting, and photographing). The touch screen 190 may output an analog signal corresponding to at least one user input into a user graphical interface to the touch screen controller 195.

The touch screen 190 may receive at least one user input through a user's body (e.g., fingers including a thumb) or the input unit 168 (e.g., a stylus pen or an electronic pen). The touch screen 190 may be of a resistive type, a capacitive type, an infrared type, an acoustic wave type, or a combination thereof.

Further, the touch screen 190 may include at least one panel which can detect touches or approaches of a finger and the input unit 168 in order to receive inputs by the finger and the input unit 168 respectively. The at least one touch panel may provide the touch screen controller 195 with different output values, and the touch screen controller 195 may differently recognize values input from the at least one touch panel to distinguish whether the input from the touch screen 190 is an input by a finger or an input by the input unit 168.

Here, the touch may include non-touches without being limited to touches between the touch screen 190 and a body part of a user or a touchable input means. Intervals at which the touch screen 190 detects touches or approaches of a finger or the input unit 168 may be changed according to the capability or structure of the electronic device 100.

The touch screen controller 195 converts an analog signal received from the touch screen 190 into a digital signal and transmits the converted digital signal to the controller 110. The controller 110 may control the touch screen 190 by using the digital signal received from the touch screen controller 195. The touch screen controller 195 may identify a hovering interval or distance as well as the position of a user input by detecting a value (e.g., a current value, etc.) output through the touch screen 190, and may also convert the identified distance value into a digital signal (e.g., a Z coordinate) and provide the converted digital signal to the controller 110.

Further, the touch screen controller 195 may detect a pressure applied from the user input means to the touch screen 190 by detecting a value (e.g., a current value, etc.) output through the touch screen 190, and may also convert the identified pressure value to a digital signal and provide the converted digital signal to the controller 110.

A detailed configuration of an electronic device according to an embodiment of the present disclosure has been described above.

Hereinafter, a method and electronic device for providing LBS by using identification information according to various embodiments of the present disclosure will be described in detail with reference to FIGS. 2 to 17.

Figure 2:
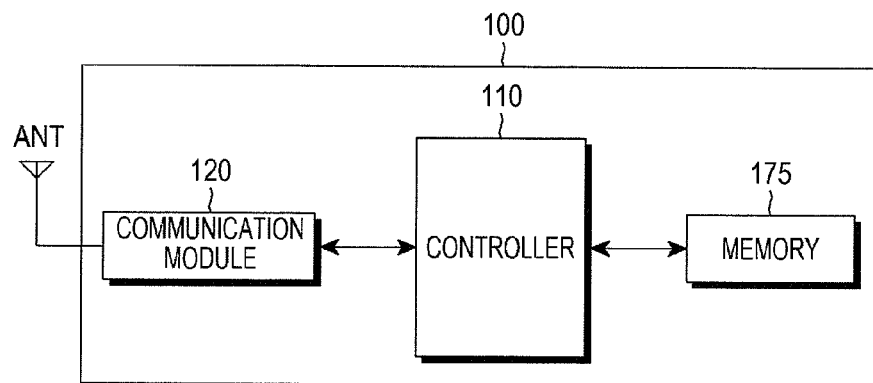
FIG. 2 illustrates a detailed configuration of an electronic device according to an embodiment of the present disclosure.

FIG. 2 illustrates a detailed configuration of an electronic device according to an embodiment of the present disclosure.

Referring to FIG. 2, the electronic device 100 may include a controller 110, a communication module 120, and a memory 175. The controller 110 may control the communication module 120 and the memory 175. In an embodiment of the present disclosure, the communication module 120 may include at least one of a mobile communication module 121 and a sub communication module 130. The memory 175 may store identification information and at least one piece of action information mapped to the identification information.

Figure 3:
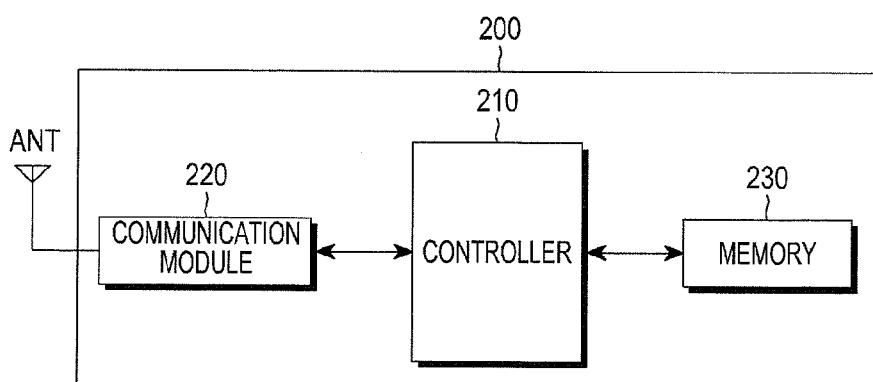
FIG. 3 illustrates a detailed configuration of a wireless network device according to an embodiment of the present disclosure.

FIG. 3 illustrates a detailed configuration of a wireless network device according to an embodiment of the present disclosure.

Referring to FIG. 3, the wireless network device 200 may include a controller 210, a communication module 220, and a memory 230. The controller 210 may control the communication module 220 and the memory 230.

The communication module 220 may transmit/receive data to/from an external electronic device (not shown).

The controller 210 may receive the identification information of the electronic device 100 from the external electronic device (not shown) through the communication module 220. Further, the controller 210 may receive the identification information and at least one piece of action information of the electronic device 100 mapped to the identification information from the external electronic device (not shown) through the communication module 220.

The external electronic device may include another wireless network device (not shown) and the electronic device 100. Further, the external electronic device may include any one of a plurality of electronic devices using a single sign on.

The controller 210 may generate information on the wireless network device 200, including the identification information of the electronic device 100.

Further, the controller 210 may generate information on the wireless network device 200, including the identification information and at least one piece of action information mapped to the identification information.

The controller 210 may transmit the generated information on the wireless network device 200 to the external electronic device (not shown) through the communication module 220.

The memory 230 may store the identification information and at least one piece of action information received from the external electronic device (not shown).

Figure 4:
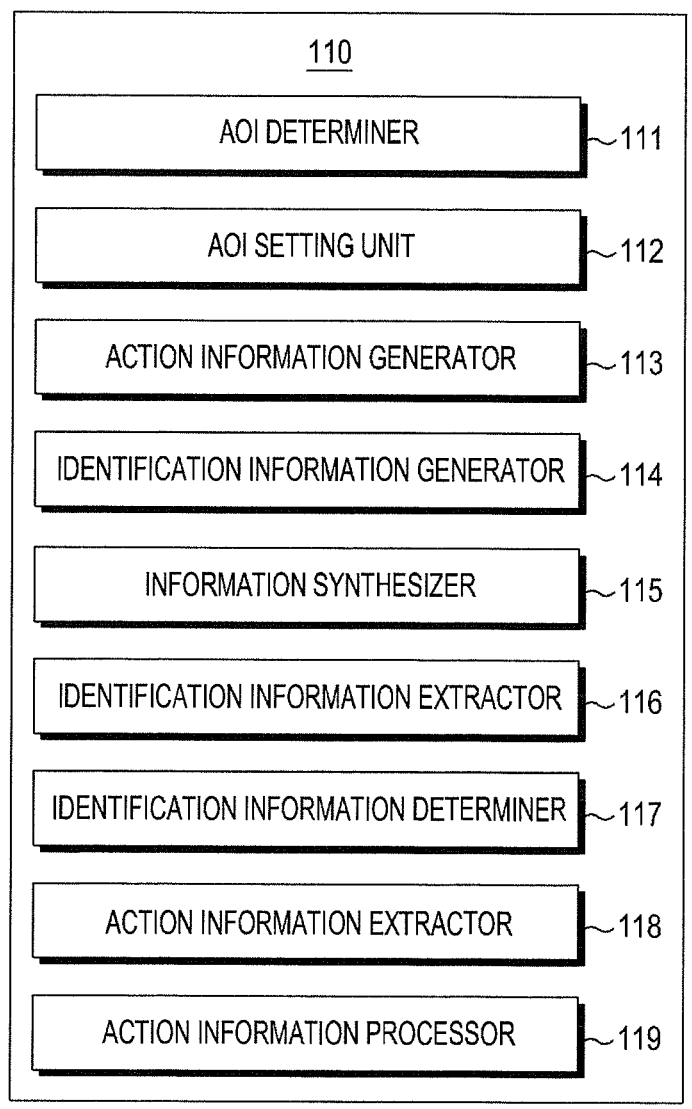
FIG. 4 illustrates a controller of an electronic device according to an embodiment of the present disclosure.

FIG. 4 illustrates a controller of an electronic device according to an embodiment of the present disclosure.

Referring to FIG. 4, the controller 110 may include an area of interest (AOI) determiner 111, an AOI setting unit 112, an action information generator 113, an identification information generator 114, an information synthesizer 115, an identification information extractor 116, an identification information determiner 117, an action information extractor 118, and an action information processor 119.

If the electronic device 100 enters an LBS area and is connected to a wireless network device 200 installed in the corresponding area through the communication module 120, then the AOI determiner 111 may determine if the area where the electronic device 100 is currently located is stored as an AOI by a user input in the memory 175. When the area corresponds to an AOI, the AOI setting unit 112 may start to be operated. Alternatively, when the area does not correspond to an AOI, the action information generator 113 may start to be operated.

The AOI setting unit 112 may receive an input value from a user to set and store an LBS area, in which the electronic device 100 is located, as an AOI. If the LBS area is stored as an AOI, then the identification information extractor 116 may start to be operated when the electronic device 100 enter the stored LBS area. As an example, when the electronic device 100 reenters the stored AOI, it may receive information on the wireless network device 200 to perform at least one predetermined function performable in the electronic device 100 or execute at least one application executable in the electronic device 100, based on at least one piece of action information.

Further, the AOI setting unit 112 may set an area, in which the electronic device 100 is currently located, as an AOI by using satellite navigation equipment provided in the electronic device 100.

When the LBS is initiated in the electronic device 100, the action information generator 113 may display at least one function performable in the electronic device 100 or at least one application executable in the electronic device 100 through a display (not shown) (e.g., the touch screen 190 as shown in FIG. 1) so as for a user to select the at least one function or application. A way to display the at least one function or application may include displaying a list popup window in a text format or displaying a plurality of icons. The at least one function or application may also be output in the form of a voice message through a speaker (e.g., the speaker 163 as shown in FIG. 1). Subsequently, the action information generator 113 may generate action information, based on the at least one function performable in the electronic device 100 or the at least one application executable in the electronic device 100, which is selected by the user. The generated action information may include information for performing the at least one function or executing the at least one application selected by the user.

Further, the action information generator 113 may generate one piece of action information for performing a plurality of functions performable in the electronic device 100 or a plurality of applications executable in the electronic device 100, which are selected by the user. As an example, if the user selects an incoming call interruption function and a music playback function, then the action information generator 113 may generate first action information corresponding to the incoming call interruption function and second action information corresponding to the music playback function. The action information generator 113 may also generate one piece of action information including information for performing both the incoming call interruption function and the music playback function.

The identification information generator 114 may generate at least one piece of identification information. The identification information is unique information for distinguishing between the electronic device 100 and any other electronic device (not shown). The identification information generator 114 may generate identification information unique to the electronic device 100 by using at least one of a serial number, media access control (MAC) address, universally administered address (UAA), locally administered address (LAA), Internet protocol (IP) address, international mobile equipment identity (IMEI), international mobile station identity (IMSI), temporary mobile subscriber identity (TMSI), mobile identification number (MIN), mobile station international subscriber directory number (MSISDN), single sign on ID, and personal identification number (PIN) of the electronic device, or may newly generate identification information, based on at least one thereof.

Further, the identification information generator 114 may map at least one piece of action information generated by the action information generator 113 to generated identification information. The mapped identification information and action information may be stored in a table format in the memory 175.

Further, identification information and action information may be mapped to each other according to at least one of user settings, manufacturer settings, and LBS provider settings. In order to facilitate the understanding of the present disclosure, an example of mapping identification information and action information to each other according to user settings will be described.

According to an embodiment of the present disclosure, a method of mapping identification information and action information to each other by the identification information generator 114 is as follows.

First, the identification information generator 114 may generate one piece of identification information and map at least one piece of action information to the generated one piece of identification information. As an example, the identification information generator 114 may map one piece of action information to one piece of identification information or map a plurality of pieces of action information to one piece of identification information.

Second, the identification information generator 114 may generate a plurality of pieces of identification information and map at least one piece of action information to each of the generated identification information. As an example, the identification information generator 114 may map one piece of action information to one piece of identification information or map a plurality of pieces of action information to one piece of identification information.

The controller 110 may transmit identification information generated by the identification information generator 114 to the wireless network device 200 installed in the LBS area through the communication module 120. The identification information transmitted by the electronic device 100 may be stored in the memory 230 of the wireless network device 200.

The controller 110 may transmit identification information generated by the identification information generator 114 and action information generated by the action information generator 113 to the wireless network device 200 installed in the LBS area through the communication module 120. The identification information and action information transmitted by the electronic device 100 may be stored in the memory 230 of the wireless network device 200.

The information synthesizer 115 may generate identification information and action information mapped to the identification information into one piece of synthesized information. As an example, the information synthesizer 115 may generate identification information and action information mapped to the identification information into one piece of synthesized information by using at least one of a bit operation, a simple operation, encoding, and compression. The electronic device 100 may optimize data transfer between the wireless network device 200 and the electronic device 100 by transmitting synthesized information generated by the information synthesizer 115 to the wireless network device 200. The electronic device 100 may enhance the security of the LBS by using synthesized information. In an embodiment of the present disclosure, synthesized information transmitted from the electronic device 100 to the wireless network device 200 may be restored to identification information and action information of the electronic device 100 mapped to the identification information in the wireless network device 200. The wireless network device 200 may store the restored identification information and action information mapped to the identification information in its memory 230. The wireless network device 200 may generate information on the wireless network device 200, including the stored identification information and action information mapped to the identification information, and transmit the generated information to the electronic device 100 located in the LBS area.

The identification information generator 116 may extract identification information from the memory 175 of the electronic device 100 or information on the wireless network device 200 received from the wireless network device 200, which includes identification information of at least one electronic device.

The identification information determiner 117 may determine if at least one piece of identification information extracted by the identification information extractor 116 is identification information generated by the identification information generator 114 of the electronic device 100 and transmitted to the wireless network device 200 installed in the LBS area through the communication module 120.

The action information extractor 118 may start to be operated when the identification information determiner 117 determines that identification information generated by the identification information generator 114 of the electronic device 100 and transmitted to the wireless network device 200 installed in the LBS area through the communication module 120 is included in received information on the wireless network device 200.

Further, the action information extractor 118 may extract action information mapped to received identification information from the memory 175 or received information on the wireless network device 200. The action information extractor 118 may extract action information from the memory 175 or received information on the wireless network device 200 according to a priority predetermined by one of a user, manufacturer, and LBS provider. As an example, when the priority is set such that extracting action information from the memory 175 of the electronic device 100 has higher priority, the action information extractor 118 may extract action information from the memory 175 of the electronic device 100 although received information on the wireless network device 200 includes action information transmitted by the corresponding electronic device 100. The priority in extracting action information may be changed by one of a user, manufacturer, and LBS provider.

Further, the action information extractor 118 may compare information on the generation date of action information stored in the memory 175 of the electronic device 100 with information on the generation date of action information included in received information on the wireless network device 200, and extract the action information generated at the latest date.

The action information processor 119 may perform at least one predetermined function or execute at least one predetermined application in the electronic device 100, based on action information extracted by the action information extractor 118. In order to facilitate the understanding of the present disclosure, it should be noted that identification info nation and action information as described below are not in the singular, but mean at least one piece of identification information and at least one piece of action information.

Identification information of the electronic device 100 may be information for allowing one electronic device to be identified from others. Alternatively, according to another embodiment of the present disclosure, identification information of the electronic device 100 may be used for not only one electronic device, but also at least one another electronic device. In this case, a plurality of electronic devices may share the same identification information with each other. This will be described in detail with reference to FIG. 9.

In some embodiments of the present disclosure, respective components of the electronic device 100 are separately illustrated in the drawings in order to indicate that they may be functionally and logically separated from each other, but this does not necessarily mean that they are physically separated or implemented by separated codes.

Further, some of respective components of the electronic device 100 may be omitted.

Further, in the specification, each component may refer to a functional or structural combination of hardware for realizing the technical idea of the present disclosure and software for driving the hardware. As an example, each component may mean a logical unit including a predetermined code and a hardware resource for executing the predetermine code, and it may be easily understood by those skilled in the art that each component does not necessarily mean a physically connected code or one and the same type of hardware.

Figure 5:
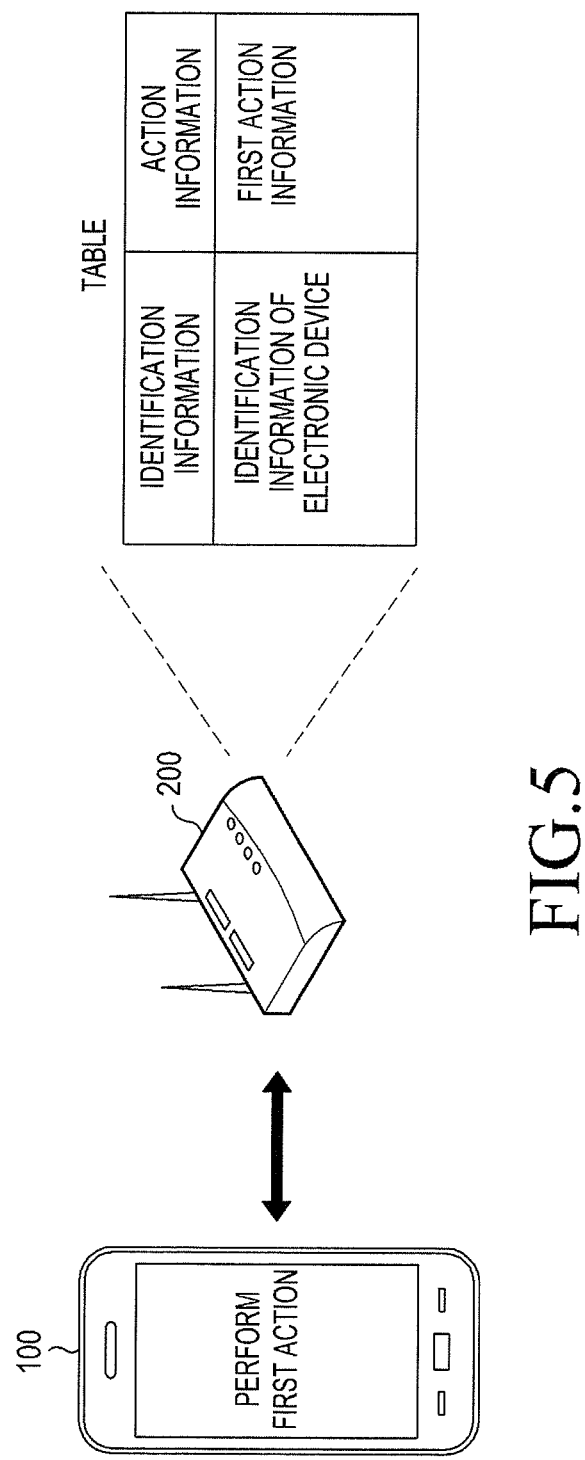
FIG. 5 illustrates a method of providing LBS by using identification information according to an embodiment of the present disclosure.

FIG. 5 illustrates a method of providing LBS by using identification information according to an embodiment of the present disclosure. Referring to FIG. 5, an electronic device 100 and a wireless network device 200 located in an LBS area are shown in the drawing. The wireless network device 200 stores identification information transmitted by the electronic device 100 and action information mapped to the identification information in its memory (not shown).

The electronic device 100 may receive information on the wireless network device 200 transmitted by the wireless network device 200, and determine if its identification information is included in the received information on the wireless network device 200. When the result of the determination shows that identification information transmitted by the electronic device 100 is included in the received information on the wireless network device 200, the electronic device 100 may extract first action information, that is, at least one piece of action information mapped to the corresponding identification information, from the memory 175 of the electronic device 100 or the received information on the wireless network device 200, and perform at least one predetermined function of the electronic device 100 or at least one application executable in the electronic device 100, based on the first action information.

If the electronic device 100 is connected to and communicates with the wireless network device 200 installed in the LBS area, then it may be operated as follows. When the electronic device 100 enters the LBS area where the wireless network device 200 is installed, it may determine if the LBS area is an area stored as an AOI in the memory 175.

When the LBS area which the electronic device 100 enters does not correspond to an AOI area, the electronic device 100 may receive an input value from a user to register the area, in which the electronic device 100 is located, as an AOI. As an example, the electronic device 100 may display the wireless network device 200 connected thereto on the screen so as for a user to identify the wireless network device 200, and register the wireless network device 200 connected thereto in the memory 175 of the electronic device 100 according to an input value from the user to set the area where the wireless network device 200 is installed, for example, the service area of the wireless network device 200, as an AOI.

If the area where the wireless network device 200 is installed is registered as an AOI according to the input value from the user, then the electronic device 100 may generate at least one piece of identification information and at least one piece of action information mapped to the identification information. The electronic device 100 may transmit the generated at least one piece of identification information and the generated at least one piece of action information mapped to the identification information to the wireless network device 200.

The wireless network device 200 may receive the at least one piece of identification information and the at least one piece of action information mapped to the identification information, which are transmitted from the electronic device 100, and store the received identification information and action information in the memory (not shown) of the wireless network device 200 in a table format. The wireless network device 200 may generate information on the wireless network device 200, including the identification information and the action information mapped to the identification information, which are stored in its memory, and transmit the generated information on the wireless network device 200 to the electronic device 100. Accordingly, the information on the wireless network device may include identification information of at least one electronic device 100. Further, the information on the wireless network device 200 may also include identification information of at least one electronic device 100 and at least one piece of action information mapped to the identification information. As an example, the wireless network device 200 may transmit the information on the wireless network device 200 to a plurality of electronic devices by using a broadcast method.

When the area which the electronic device 100 enters is registered as an AOI in the memory 175 of the electronic device 100, this corresponds to a case where at least one piece of identification information and at least one piece of action information of the electronic device 100 mapped to the identification information are previously transmitted from the electronic device 100 to the wireless network device 200. As an example, this corresponds to a case where the electronic device 100 reenters an LBS area stored as an AOI.

The electronic device 100 determines if identification information transmitted by the electronic device 100 is included in the information on the wireless network device 200 received from the wireless network device 200. The information on the wireless network device may include identification information of at least one electronic device.

When identification information transmitted by the electronic device 100 is included in the information on the wireless network device 200, the electronic device 100 may extract action information mapped to the identification information from the memory 175 of the electronic device 100 or the information on the wireless network device 200, and perform at least one predetermined function of the electronic device 100 or execute at least one application executable in the electronic device 100, based on the extracted action information.

Figure 6:
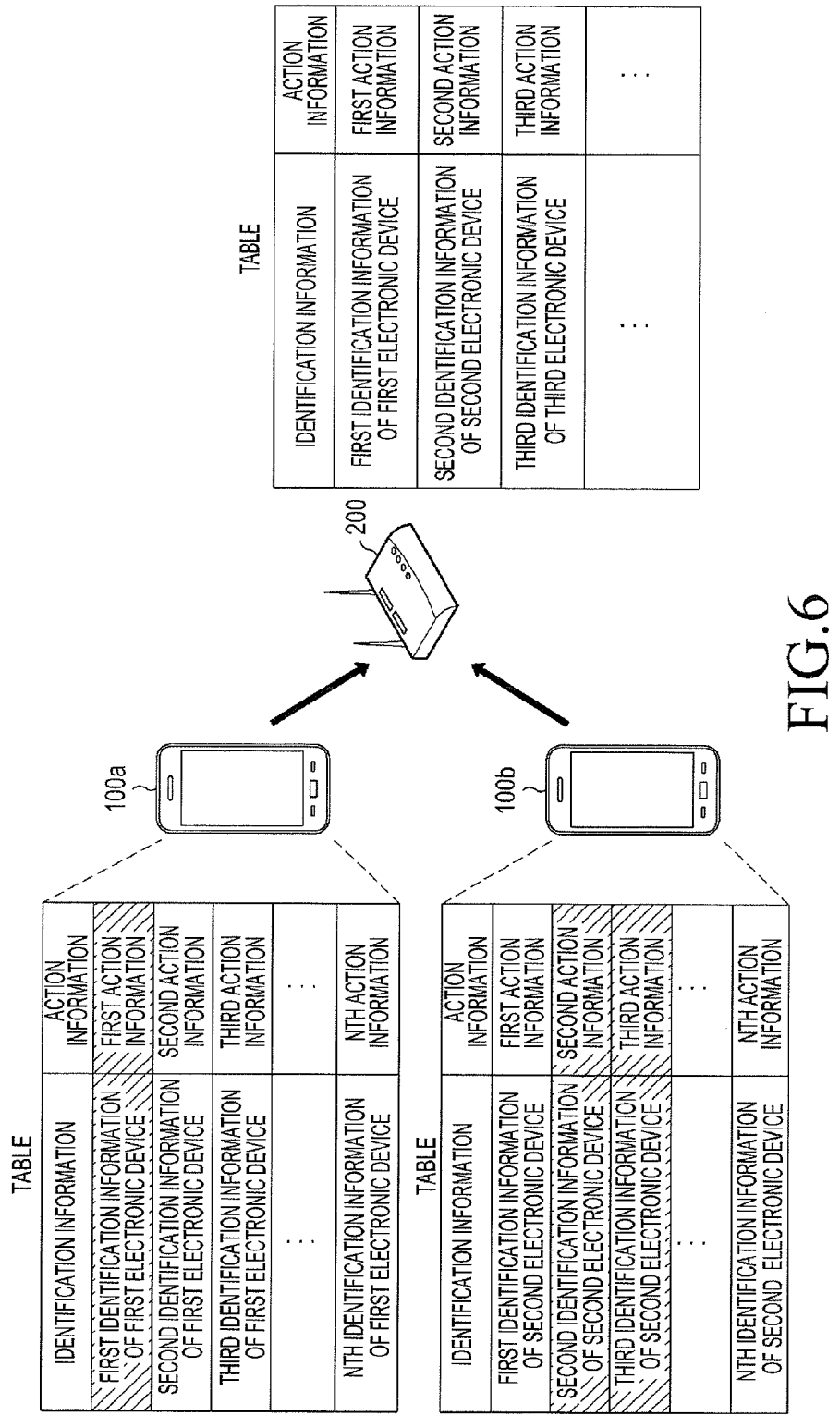
FIG. 6 illustrates a method of transmitting identification information and action information from an electronic device to a wireless network device according to an embodiment of the present disclosure.

FIG. 6 illustrates a method of transmitting identification information and action information from an electronic device to a wireless network device according to an embodiment of the present disclosure. Referring to FIG. 6, each of a first electronic device 100a and a second electronic device 100b may be the electronic device described with reference to FIG. 2. Each of the first and second electronic devices 100a, 100b generates identification information and action information mapped to the identification information and stores the generated identification information and action information in a table format in its memory 175. The plurality of pieces of identification information and the plurality of pieces of action information generated by the first and second electronic devices 100a, 100b are mapped one-to-one or one-to-many to each other. As an example, the first identification information of the first electronic device 100a generated by the first electronic device 100a is mapped to the first action information of the first electronic device 100a. The first to Nth identification information of the first electronic device 100a are unique identification information for allowing the first electronic device 100a to be distinguished from other electronic devices.

Further, the first identification information of the second electronic device 100b generated by the second electronic device 100b is mapped to the first action information of the second electronic device 100b. The first to Nth identification information of the second electronic device 100b are unique identification information for allowing the second electronic device 100b to be distinguished from other electronic devices. Basically, since the electronic device 100 receives an input value from a user and sets action information according to the received input value, it may generate different action information.

In some embodiments of the present disclosure, when the same user uses the first electronic device 100a and the second electronic device 100b, any one of the first to Nth action information of the first electronic device 100a may include the same information as any one of the first to Nth action information of the second electronic device 100b. FIG. 6 shows an example where the first electronic device 100a receives an input value from a user and transmits the first identification information and the first action information of the first electronic device 100a to the wireless network device 200 according to the received input value. Further, FIG. 6 shows an example where the second electronic device 100b receives an input value from a user and transmits the second identification information, the second action information, the third identification information, and the third action information of the second electronic device 100b to the wireless network device 200 according to the received input value.

The wireless network device 200 may store the identification information and action information received from the plurality of electronic devices 100a, 100b in the memory (not shown) of the wireless network device 200. As an example, the identification information and action information may be stored in a table format in the memory of the wireless network device 200. Further, the wireless network device 200 may store only the identification information received from the plurality of electronic devices 100a, 100b in the memory of the wireless network device 200. As an example, the identification information may be stored in a table format in the memory of the wireless network device 200.

Figure 7:
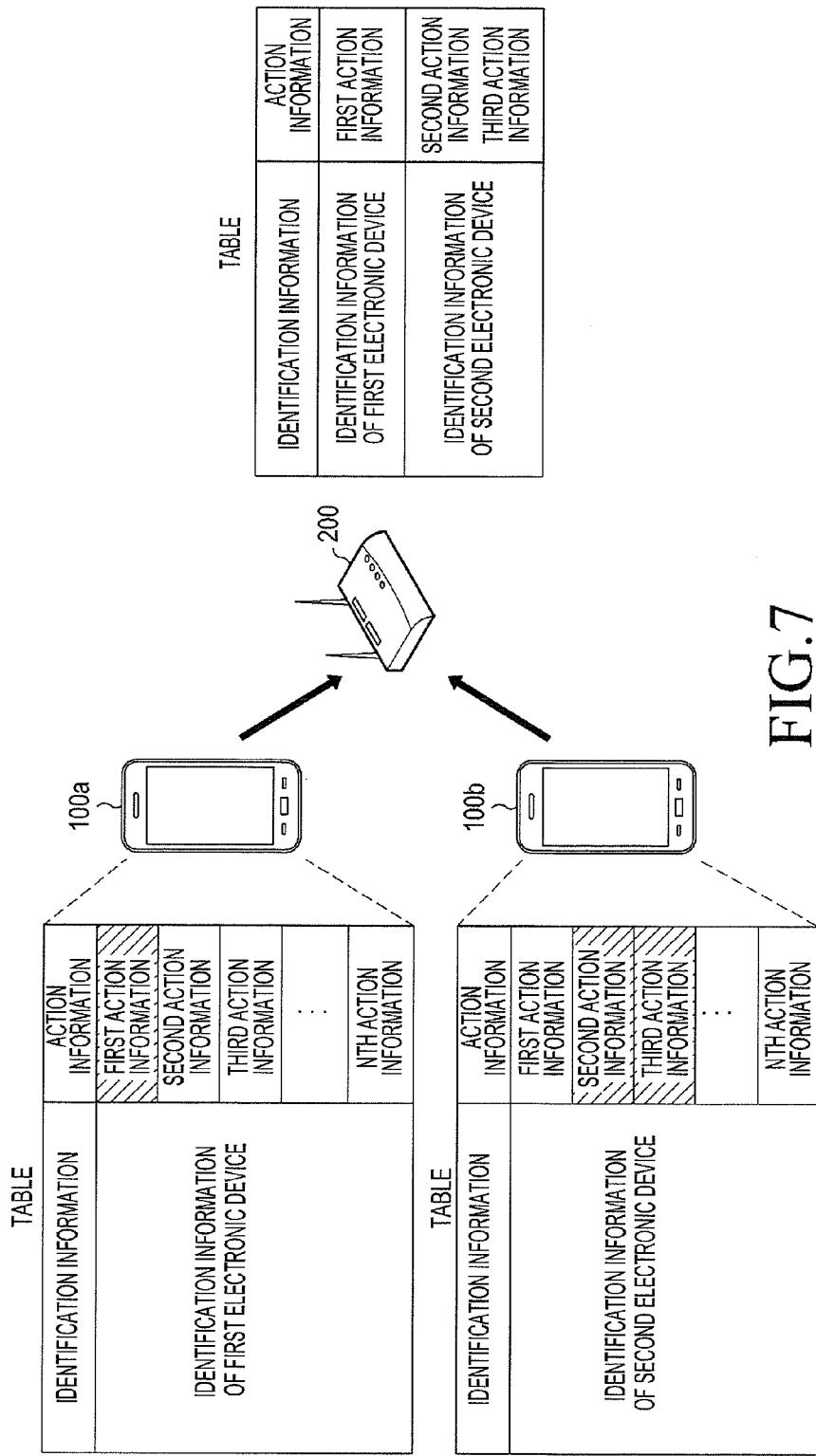
FIG. 7 illustrates a method of transmitting identification information and action information from an electronic device to a wireless network device according to another embodiment of the present disclosure.

FIG. 7 illustrates a method of transmitting identification information and action information from an electronic device to a wireless network device according to another embodiment of the present disclosure. Referring to FIG. 7, each of a first electronic device 100a and a second electronic device 100b may be the electronic device described with reference to FIG. 2. Each of the first and second electronic devices 100a, 100b generates identification information and action information mapped to the identification information and stores the generated identification information and action information in a table format in its memory 175. A plurality of pieces of action information are mapped to each of the identification information generated by the first and second electronic devices 100a, 100b. As an example, the identification information of the first electronic device 100a generated by the first electronic device 100a is mapped to the first to Nth action information of the first electronic device 100a. The identification information of the first electronic device 100a is unique identification information for allowing the first electronic device 100a to be distinguished from other electronic devices.

Further, the identification information of the second electronic device 100b generated by the second electronic device 100b is mapped to the first to Nth action information of the second electronic device 100b. The identification information of the second electronic device 100b is unique identification information for allowing the second electronic device 100b to be distinguished from other electronic devices.

In FIG. 7, the first electronic device 100a receives an input value from a user and transmits the identification information and the first action information of the first electronic device 100a to the wireless network device 200 according to the received input value. Further, in FIG. 7, the second electronic device 100b receives an input value from a user and transmits the identification information, the second action information, and the third action information of the second electronic device 100b to the wireless network device 200 according to the received input value.

The wireless network device 200 may store the identification information and action information received from the plurality of electronic devices 100a, 100b in the memory (not shown) of the wireless network device 200. As an example, the identification information and action information may be stored in a table format in the memory of the wireless network device 200. Further, the wireless network device 200 may store only the identification information received from the plurality of electronic devices 100a, 100b in the memory of the wireless network device 200. As an example, the identification information may be stored in a table format in the memory of the wireless network device 200.

FIGS. 8A through 8D illustrate examples of a configuration of information that is transmitted from an electronic device to a wireless network device according to an embodiment of the present disclosure. The electronic device 100 may generate at least one piece of action information and then generate at least one piece of identification information to be mapped to the generated action information.

Referring to FIG. 8A, the electronic device 100 may generate first identification information and second identification information. Each of the generated at least one piece of identification information may be mapped to at least one piece of action information. As an example, the first identification information of the electronic device 100 may be mapped to first action information, and the second identification information of the electronic device 100 may be mapped to second action information. FIG. 8A illustrates that the electronic device 100 transmits only the identification information excluding the action information to the wireless network device 200.

When the electronic device 100 transmits the identification information to the wireless network device 200, it may transmit the first and second identification information in distinguishable formats.

Referring to FIG. 8B, the electronic device 100 may generate first identification information, first action information mapped to the first identification information, second identification information, and second action information mapped to the second identification information. The generated identification information may be mapped one-to-one to the generated action information. As an example, the first identification information of the electronic device 100 may be mapped to first action information, and the second identification information of the electronic device 100 may be mapped to second action information.

When the electronic device 100 transmits the generated identification information and action information to the wireless network device 200, it may transmit the first identification information, the first action information, the second identification information, and the second action information in distinguishable formats.

Referring to FIG. 8C, the electronic device 100 may generate first identification information, first action information, and second action information. The generated first identification information may be mapped to at least one piece of action information. As an example, the first identification information of the electronic device 100 may be mapped to the first action information and the second action information.

When the electronic device 100 transmits the generated first identification information, first action information, and second action information to the wireless network device 200, it may transmit the first identification information, the first action information, and the second action information in distinguishable formats.

Referring to FIG. 8D, the electronic device 100 may generate identification information and action information mapped to the identification information into one piece of synthesized information and transmit the generated synthesized information to the wireless network device 200.

Figure 9:
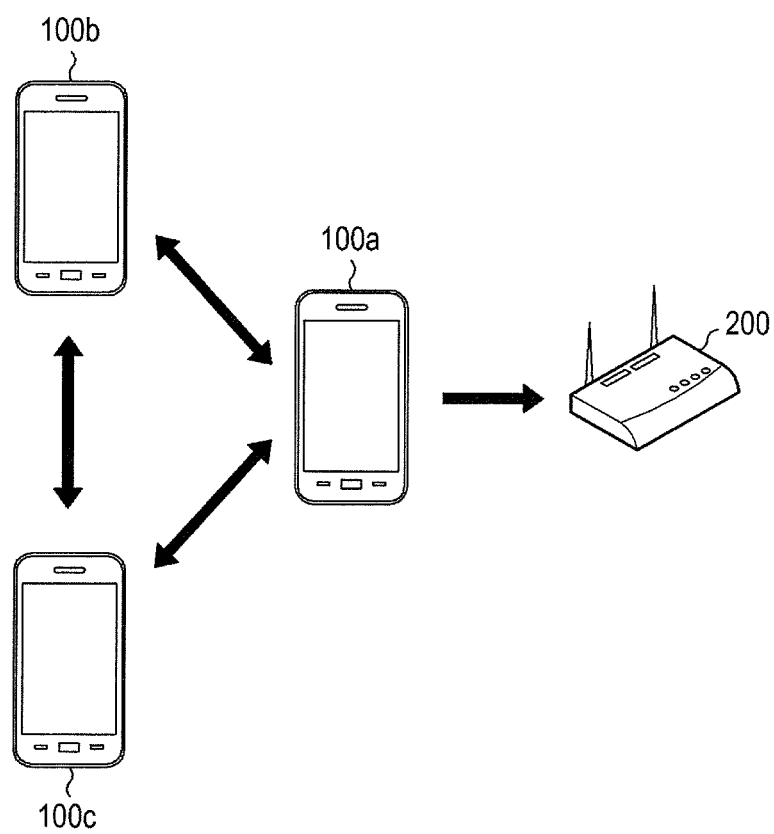
FIG. 9 illustrates a method of transmitting identification information and action information from a plurality of electronic devices, which provide LBS by using identification information of a single sign on type, to a wireless network device according to an embodiment of the present disclosure.

FIG. 9 illustrates a method of transmitting identification information and action information from a plurality of electronic devices, which provide LBS by using identification information of a single sign on type, to a wireless network device according to an embodiment of the present disclosure. Referring to FIG. 9, a plurality of electronic devices 100a, 100b, 100c using a single sign on method may generate at least one piece of identification information and at least one piece of action information respectively. Each of the generated identification information is unique information for allowing each electronic device to be distinguished from other electronic devices.

In order to use any one of the identification information of the plurality of electronic devices 100a, 100b, 100c in the single sign on method, a user may select one of the plurality of electronic devices 100a, 100b, 100c and map at least one piece of identification information of the selected electronic device to the identification information of the remaining electronic devices. As an example, when the first electronic device 100a is selected from among the plurality of electronic devices 100a, 100b, 100c, each of the remaining electronic devices, that is, the second and third electronic devices 100b, 100c, may map at least one piece of identification information of the first electronic device 100a to its at least one identification information. Accordingly, if any one of the plurality of electronic devices 100a, 100b, 100c enters the service area of the wireless network device 200 and receives information on the wireless network device 200, including at least one piece of identification information of the first electronic device 100a, then the corresponding electronic device may recognize the at least one piece of identification information as its own identification information, extract at least one piece of action information mapped to the identification information, and then perform the following operation, based on the extracted action information. As an example, when at least one piece of action information is extracted from the information on the wireless network device 200, the plurality of electronic devices 100a, 100b, 100c may perform at least one function or execute at least one application predetermined for the plurality of electronic devices 100a, 100b, 100c, based on the action information predetermined by a user.

Further, the plurality of electronic devices 100a, 100b, 100c may be operated according to different action information. As an example, the plurality of electronic devices 100a, 100b, 100c using the single sign on method may generate at least one piece of unique identification information respectively. The plurality of electronic devices 100a, 100b, 100c may receive an input value from a user, and the user may select any one of the plurality of electronic devices 100a, 100b, 100c corresponding to the input value. The identification information of the selected electronic device may be used as identification information shared by the plurality of electronic devices 100a, 100b, 100c using the single sign on method.

Figure 10:
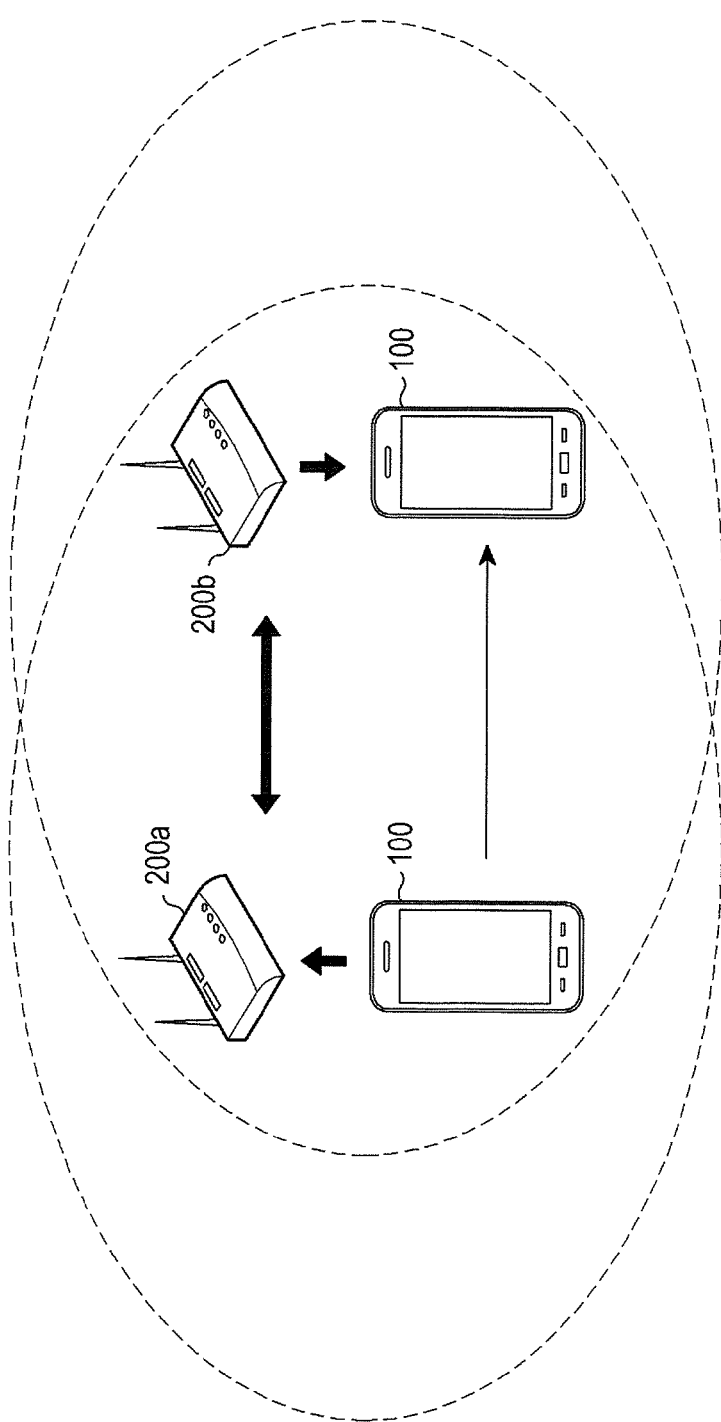
FIG. 10 illustrates a method of receiving identification information from a plurality of electronic devices, which provide LBS by using identification information, by an electronic device according to an embodiment of the present disclosure.

FIG. 10 illustrates a method of receiving identification information from a plurality of wireless network devices, which provide LBS by using identification information, by an electronic device according to an embodiment of the present disclosure. Referring to FIG. 10, the communication radius of a first wireless network device 200a overlaps the communication radius of a second wireless network device 200b. Accordingly, the first and second wireless network devices 200a, 200b may communicate with each other. Further, the first and second wireless network devices 200a, 200b may communicate with each other through wired connection.

The electronic device 100 may enter the service area of the first wireless network device 200a and transmit at least one piece of identification information of the electronic device 100 to the first wireless network device 200a. The first wireless network device 200a may store the received at least one piece of identification information in the memory (not shown) of the first wireless network device 200a.

Further, the electronic device 100 may transmit at least one piece of identification information and at least one piece of action information mapped to the identification information to the first wireless network device 200a.

Further, the first wireless network device 200a may store the received at least one piece of identification information and at least one piece of action information in the memory of the first wireless network device 200a.

When identification information of a new electronic device is stored in the memory of each of the first wireless network device 200a and the second wireless network device 200b, the first and second wireless network devices 200a, 200b may exchange the stored data with each other to update their stored identification information and action information.

When the electronic device 100 moves into the service area of the second wireless network device 200b, the electronic device 100 does not transmit its identification information to the second wireless network device 200b, but still may receive information on the second wireless network device 200b, including its identification information, extract at least one piece of action information mapped to the identification information, and then be operated based on the extracted action information.

Further, the plurality of wireless network devices 200a, 200b may be installed in locations independent of each other such that they can communicate with each other wirelessly or using a wired connection. The plurality of wireless network devices 200a, 200b may provide services with the same purpose. If one of the plurality of wireless network devices 200a, 200b stores identification information of the electronic device 100, then the plurality of wireless network devices 200a, 200b may exchange the identification information with each other to update their stored identification information and action information. The electronic device 100 may move from the current location and enter the service area of one of the plurality of wireless network devices 200a, 200b. The electronic device 100 is connected to the wireless network device to receive information on the wireless network device, including identification information transmitted by the electronic device 100. As an example, wireless network devices installed in a specific brand's chain stores may provide the respective chain stores with the same LBS. If the electronic device 100 transmits its identification information to one of the wireless network devices installed in the plurality of chain stores, it may be provided with information on the wireless network device, including its identification information, from the wireless network devices installed in the plurality of chain stores.

Figure 11:
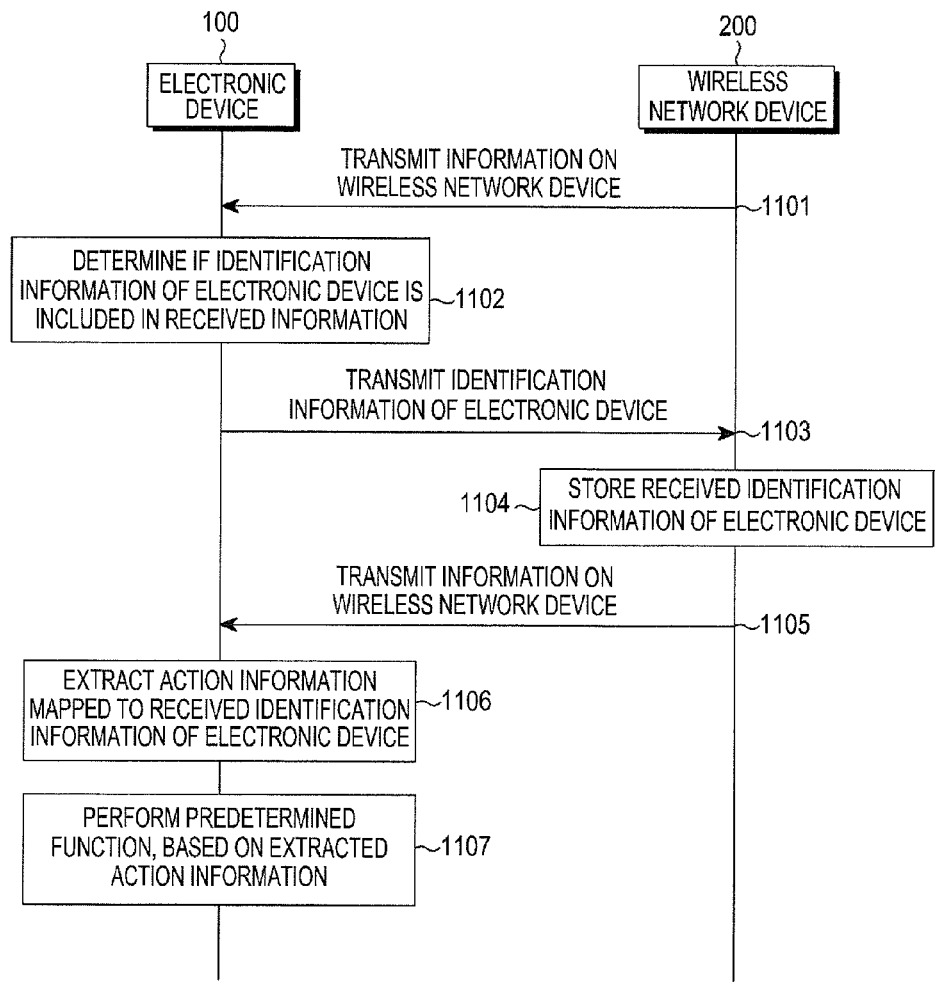
FIG. 11 illustrates signal flow in a method of providing LBS by using identification information according to an embodiment of the present disclosure.

FIG. 11 illustrates signal flow in a method of providing LBS by using identification information according to an embodiment of the present disclosure. Referring to FIG. 11, an electronic device 100 may receive information on a wireless network device 200 from the wireless network device 200 (1101). The information on the wireless network device 200 received from the wireless network device 200 may include identification information of at least one electronic device. Further, the information on the wireless network device 200 received from the wireless network device 200 may include identification information and at least one piece of action information of at least one electronic device.

The electronic device 100 may determine if at least one piece of identification information transmitted by the electronic device 100 is included in the received information on the wireless network device 200 (1102). When the result of the determination shows that at least one piece of identification information transmitted by the electronic device 100 is not included in the received information on the wireless network device 200, a user may register the corresponding service area as an AOI in the memory of the electronic device 100, and then the electronic device 100 may transmit identification information of the electronic device 100 to the wireless network device 200 (1103). Further, the electronic device 100 may transmit identification information and action information mapped to the identification information to the wireless network device 200.

The wireless network device 200 may store the received identification information in the memory (not shown) of the wireless network device 200 (1104). Further, when the wireless network device 200 receives identification information and action information mapped to the identification information together, it may store the received identification information and action information in a table format, in which the identification and action information are mapped one-to-one or one-to-many, in the memory of the wireless network device 200. The wireless network device 200 may generate information on the wireless network device 200, including identification information and action information mapped to the identification information, which are stored in the memory of the wireless network device 200, and transmit the generated information on the wireless network device 200 to electronic devices located in its service area.

The electronic device 100 may receive the information on the wireless network device 200. When at least one piece of identification information transmitted by the electronic device 100 is included in the received information on the wireless network device 200, the electronic device 100 may extract at least one piece of action information mapped to the received identification information from the memory of the electronic device 100 or the received information on the wireless network device 200 (1106). Action information may be stored in a table format, in which identification and action information are mapped one-to-one or one-to-many, in the memory 175 of the electronic device 100. Accordingly, the electronic device 100 may extract at least one piece of action information mapped to identification information stored in the memory 175.

When at least one piece of action information mapped to the received identification information does not exist in the memory 175, the electronic device 100 may determine if at least one piece of action information transmitted by the electronic device 100 is included in the received information on the wireless network device 200. When the result of the determination shows that at least one piece of action information transmitted by the electronic device 100 is included in the received information on the wireless network device 200, the electronic device 100 may extract the at least one piece of action information from the received information on the wireless network device 200. The electronic device 100 may perform at least one function or execute at least one application predetermined for the electronic device 100, based on the extracted at least one piece of action information (1107).

Figure 12:
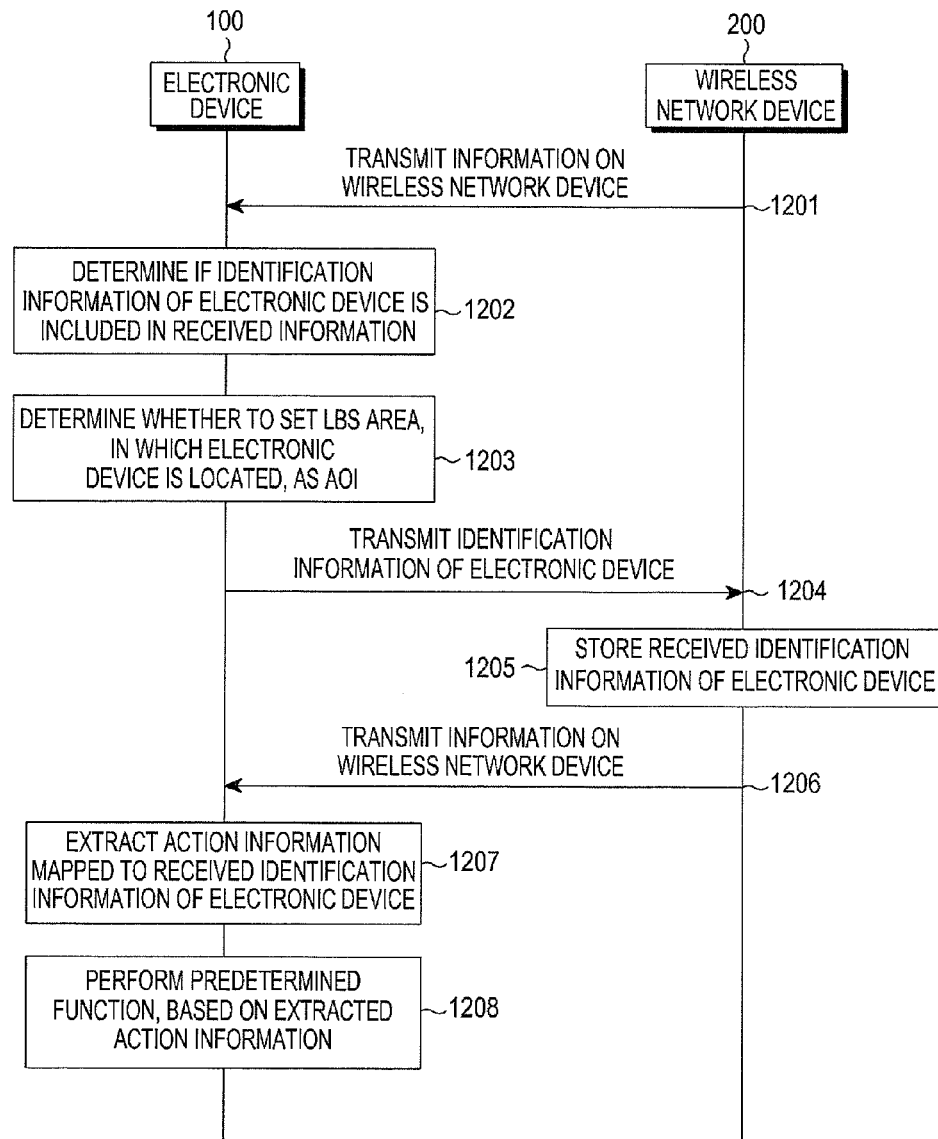
FIG. 12 illustrates signal flow in a method of providing LBS by using identification information according to another embodiment of the present disclosure.

FIG. 12 illustrates signal flow in a method of providing LBS by using identification information according to another embodiment of the present disclosure. Referring to FIG. 12, an electronic device 100 may receive information on a wireless network device 200 from the wireless network device 200 (1201). The information on the wireless network device 200 transmitted by the wireless network device 200 may include identification information of at least one electronic device. Further, the information on the wireless network device 200 transmitted by the wireless network device 200 may include identification information and at least one piece of action information of at least one electronic device.

The electronic device 100 may determine if at least one piece of identification information transmitted by the electronic device 100 is included in the received information on the wireless network device 200 (1202).

When the result of the determination shows that at least one piece of identification information transmitted by the electronic device 100 is not included in the received information on the wireless network device 200, the electronic device 100 may receive an input value from a user. Based on the received input value, the electronic device 100 may determine whether to set the service area, in which the electronic device 100 is currently located, as an AOI (1203).

If the service area, in which the electronic device 100 is currently located, is set as an AOI, then the electronic device 100 may generate at least one piece of identification information and at least one piece of action information. The generated at least one piece of identification information may be mapped to the generated at least one piece of action information, and the mapped identification information and action information may be stored in the memory 175. The electronic device 100 may transmit at least one piece of identification information to the wireless network device 200 (1204). Further, the electronic device 100 may transmit at least one piece of identification information and at least one piece of action information mapped to the at least one piece of identification information to the wireless network device 200.

The wireless network device 200 may receive at least one piece of identification information transmitted by the electronic device 100 and store the received at least one piece of identification information in the memory (1205). Further, the wireless network device 200 may receive at least one piece of identification information and at least one piece of action information transmitted by the electronic device 100 and store the received at least one piece of identification information and at least one piece of action information in the memory.

The wireless network device 200 may generate information on the wireless network device 200, including information newly stored in the memory of the wireless network device 200. Accordingly, the information on the wireless network device 200 may include identification information of at least one electronic device.

The wireless network device 200 may transmit updated information on the wireless network device 200 to unspecified electronic devices by using a broadcast method (1206).

The electronic device 100 may receive information on the wireless network device 200 transmitted by the wireless network device 200. The electronic device 100 may determine if at least one piece of identification information transmitted by the electronic device 100 is included in the received information on the wireless network device 200. When the result of the determination shows that at least one piece of identification information transmitted by the electronic device 100 is included in the received information on the wireless network device 200, the electronic device 100 may extract at least one piece of action information mapped to the received identification information (1207).

The electronic device 100 may perform at least one function or execute at least one application predetermined for the electronic device 100, based on the extracted at least one piece of action information (1208).

Figure 13:
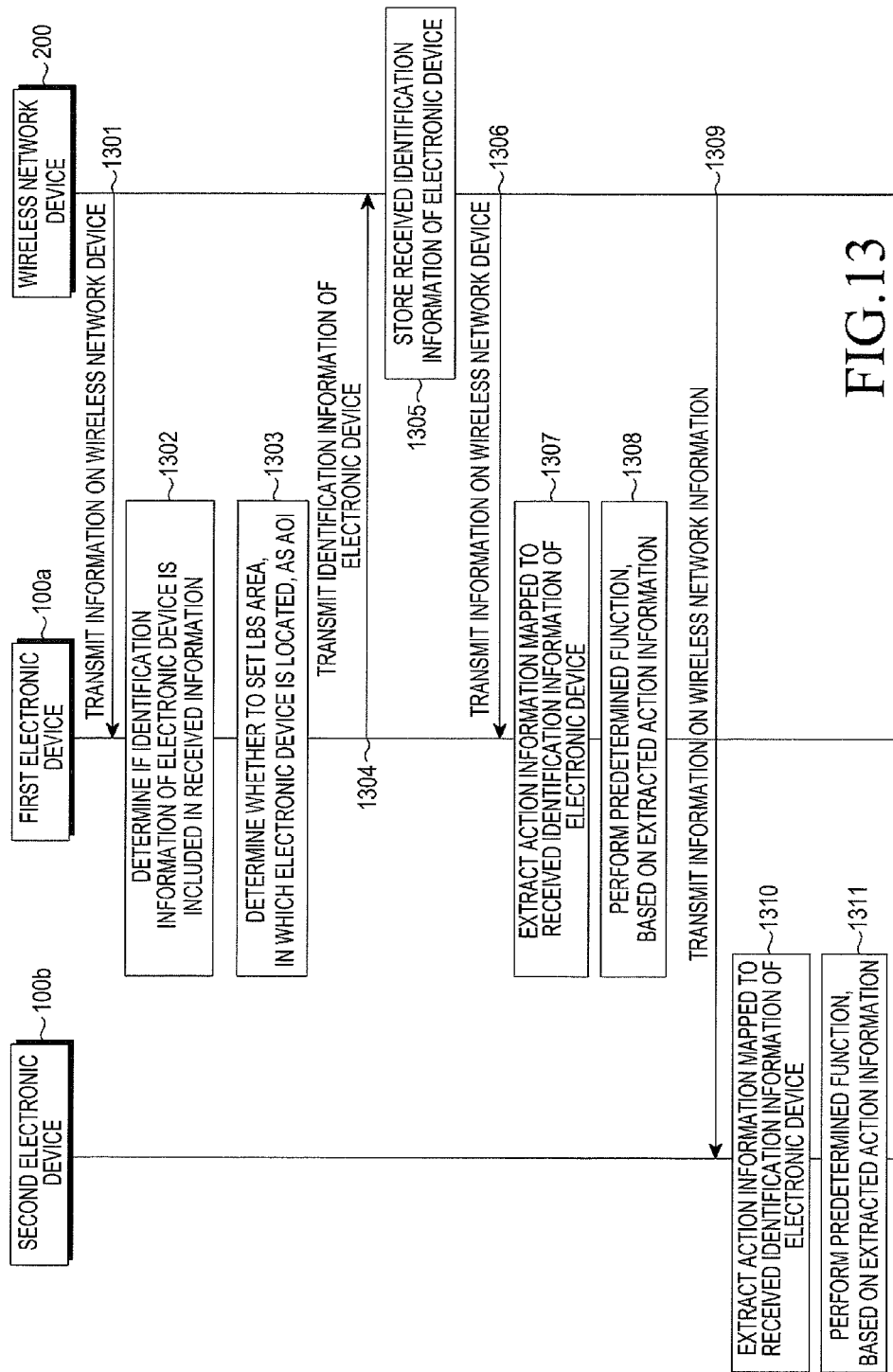
FIG. 13 illustrates signal flow in a method of controlling a plurality of electronic devices that provide LBS by using identification information of a single sign on type according to an embodiment of the present disclosure.

FIG. 13 illustrates signal flow in a method of controlling a plurality of electronic devices that provide LBS by using identification information of a single sign on type according to an embodiment of the present disclosure. Referring to FIG. 13, a first electronic device 100a may receive information on a wireless network device 200 transmitted by the wireless network device 200 (1301). The information on the wireless network device 200 transmitted by the wireless network device 200 may include identification information of at least one electronic device. Further, the information on the wireless network device 200 transmitted by the wireless network device 200 may include identification information and at least one piece of action information of at least one electronic device.

The first electronic device 100a may determine if at least one piece of identification information transmitted by the first electronic device 100a is included in the received information on the wireless network device 200 (1302). When the result of the determination shows that at least one piece of identification information transmitted by the first electronic device 100a is not included in the received information on the wireless network device 200, the first electronic device 100a may receive an input value from a user and set the service area, in which the first electronic device 100a is currently located, as an AOI, based on the received input value (1303).

If the service area in which the first electronic device 100a is currently located, is set as an AOI, then the first electronic device 100a may generate at least one piece of identification information and at least one piece of action information. The generated at least one piece of identification information may be mapped to the generated at least one piece of action information, and the mapped identification information and action information may be stored in the memory 175. The first electronic device 100a may transmit at least one piece of identification information to the wireless network device 200 (1304). Further, the first electronic device 100a may transmit at least one piece of identification information and at least one piece of action information mapped to the identification information to the wireless network device 200.

The wireless network device 200 may receive at least one piece of identification information transmitted by the first electronic device 100a and store the received at least one piece of identification information in the memory (not shown) (1305). Further, the wireless network device 200 may receive at least one piece of identification information and at least one piece of action information transmitted by the first electronic device 100a and store the received at least one piece of identification information and at least one piece of action information in the memory. The wireless network device 200 may generate information on the wireless network device 200, including information newly stored in the memory of the wireless network device 200. Accordingly, the information on the wireless network device 200 may include identification information of at least one electronic device.

The wireless network device 200 may transmit updated information on the wireless network device 200 to unspecified electronic devices including the first electronic device 100a and a second electronic device 100b by using a broadcast method (1306).

The first electronic device 100a may receive information on the wireless network device 200 transmitted by the wireless network device 200. The first electronic device 100a may determine if at least one piece of identification information transmitted by the first electronic device 100a is included in the received information on the wireless network device 200. When the result of the determination shows that at least one piece of identification information transmitted by the first electronic device 100a is included in the received information on the wireless network device 200, the first electronic device 100a may extract at least one piece of action information mapped to the received identification information (1307).

The first electronic device 100a may perform at least one function or execute at least one application predetermined for the first electronic device 100a, based on the extracted at least one piece of action information (1308).

The wireless network device 200 may transmit updated information on the wireless network device 200 to unspecified electronic devices including the first electronic device 100a and the second electronic device 100b by using a broadcast method (1309).

According to an embodiment of the present disclosure, the second electronic device 100b using identification information of a single sign on type with the first electronic device 100a may receive information on the wireless network device 200 transmitted by the wireless network device 200. The second electronic device 100b may determine if at least one piece of identification information transmitted by the first electronic device 100a is included in the received information on the wireless network device 200. When the result of the determination shows that at least one piece of identification information transmitted by the first electronic device 100a is included in the received information on the wireless network device 200, the second electronic device 100b may extract at least one piece of action information mapped to the received identification information (1310).

The second electronic device 100b may perform at least one function or execute at least one application predetermined for the second electronic device 100b, based on the extracted at least one piece of action information (1311). The first electronic device 100a and the second electronic device 100b are electronic devices using identification information of a single sign on type. At least one piece of identification information of the first electronic device 100a and at least one piece of identification information of the second electronic device 100b may be mapped to each other. Any one of the first and second electronic devices 100a, 100b may receive information on the wireless network device 200, including at least one piece of identification information of the first electronic device 100a, from the wireless network device 200. The any one electronic device may determine if at least one piece of identification information transmitted by the first electronic device 100a is included in the received information on the wireless network device 200.

When the result of the determination shows that at least one piece of identification information transmitted by the first electronic device 100*a* is included in the received information on the wireless network device 200, the any one electronic device may extract at least one piece of action information mapped to the received identification information. The any one electronic device may perform at least one function or execute at least one application predetermined for the any one electronic device, based on the extracted at least one piece of action information.

Figure 14:
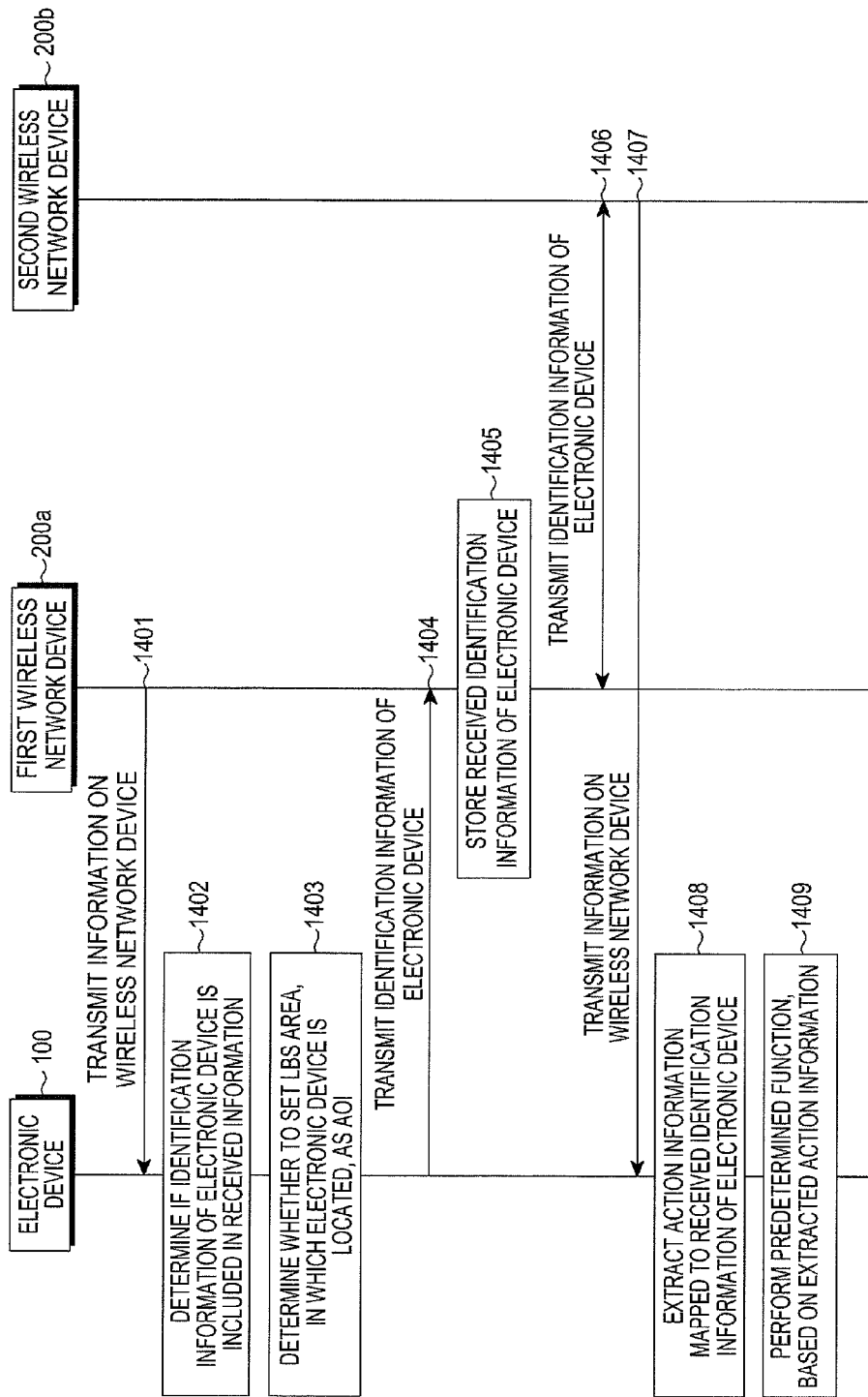
FIG. 14 illustrates signal flow in a method of controlling an electronic device and a plurality of wireless network devices according to an embodiment of the present disclosure.

FIG. 14 illustrates signal flow in a method of controlling an electronic device and a plurality of wireless network devices according to an embodiment of the present disclosure. Referring to FIG. 14, a first wireless network device 200*a* and a second wireless network devices 200*b* may communicate with each other through wireless or wired connection.

The electronic device 100 may receive information on the first wireless network device 200*a* transmitted by the first wireless network device 200*a* (1401). The information on the first wireless network device 200*a* transmitted by the first wireless network device 200*a* may include identification information of at least one electronic device. Further, the information on the first wireless network device 200*a* transmitted by the first wireless network device 200*a* may include identification information and at least one piece of action information of at least one electronic device.

The electronic device 100 may determine if at least one piece of identification information transmitted by the electronic device 100 is included in the received information on the first wireless network device 200*a* (1402). When the result of the determination shows that at least one piece of identification information transmitted by the electronic device 100 is not included in the received information on the first wireless network device 200*a*, the electronic device 100 may receive an input value from a user. Based on the received input value, the electronic device 100 may determine whether to set the service area, in which the electronic device 100 is currently located, as an AOI (1403).

If the service area, in which the electronic device 100 is currently located, is set as an AOI, then the electronic device 100 may generate at least one piece of identification information and at least one piece of action information. The generated at least one piece of identification information may be mapped to the generated at least one piece of action information, and the mapped identification information and action information may be stored in the memory 175. The electronic device 100 may transmit at least one piece of identification information to the first wireless network device 200*a* (1404). Further, the electronic device 100 may transmit at least one piece of identification information and at least one piece of action information mapped to the identification information to the first wireless network device 200*a*.

The first wireless network device 200*a* may receive at least one piece of identification information transmitted by the electronic device 100 and store the received at least one piece of identification information in the memory (not shown) (1405). Further, the first wireless network device 200*a* may receive at least one piece of identification information and at least one piece of action information transmitted by the electronic device 100 and store the received at least one piece of identification information and at least one piece of action information in the memory.

If there is data additionally stored in each of the memories of the first and second wireless network devices 200*a*, 200*b*, then the first wireless network device 200*a* and the second wireless network device 200*b* may transmit the updated data to each other, receive the transmitted data, and store the received data in their memories respectively (1406). Further, the first and second wireless network devices 200*a*, 200*b* may store identification information or identification information and action information transmitted by at least one electronic device in a separate server (not shown) and share the information stored in the server with each other.

The first and second wireless network devices 200*a*, 200*b* may generate information on the first wireless network device 200 and information on the second wireless network device 200*b*, each including information newly stored in the memory of each of the first and second wireless network devices 200*a*, 200*b*. Accordingly, the information on the first wireless network device 200*a* and the information on the second wireless network device 200*b* may include identification information of at least one electronic device.

The second wireless network device 200*b* may transmit updated information on the second wireless network device 200*b* to unspecified electronic devices by using a broadcast method (1407).

If the electronic device 100 enters the service area of the second wireless network device 200*b*, then it may receive information on the second wireless network device 200*b* transmitted by the second wireless network device 200*b*. The electronic device 100 may determine if at least one piece of identification information transmitted by the electronic device 100 is included in the received information on the second wireless network device 200*b*. When the result of the determination shows that at least one piece of identification information transmitted by the electronic device 100 is included in the received information on the second wireless network device 200*b*, the electronic device 100 may extract at least one piece of action information mapped to the received identification information (1408).

The electronic device 100 may perform at least one function or execute at least one application predetermined for the electronic device 100, based on the extracted at least one piece of action information (1409).

Further, the plurality of wireless network devices 200*a*, 200*b* may be installed in different locations independent of each other such that they can communicate with each other wirelessly or using a wired connection. The plurality of wireless network devices 200*a*, 200*b* may provide services with the same purpose. If one of the plurality of wireless network devices 200*a*, 200*b* stores identification information of the electronic device 100, then the plurality of wireless network devices 200*a*, 200*b* exchange the identification information with each other and update identification information and action information stored in the memory of each of the plurality of wireless network devices 200*a*, 200*b*. The electronic device may move from the current location and enter the service area of one of the plurality of wireless network devices 200*a*, 200*b*. The electronic device 100 may be connected to the corresponding wireless network device and receive information on the corresponding wireless network device, including identification information transmitted by the electronic device 100.

Figure 15:
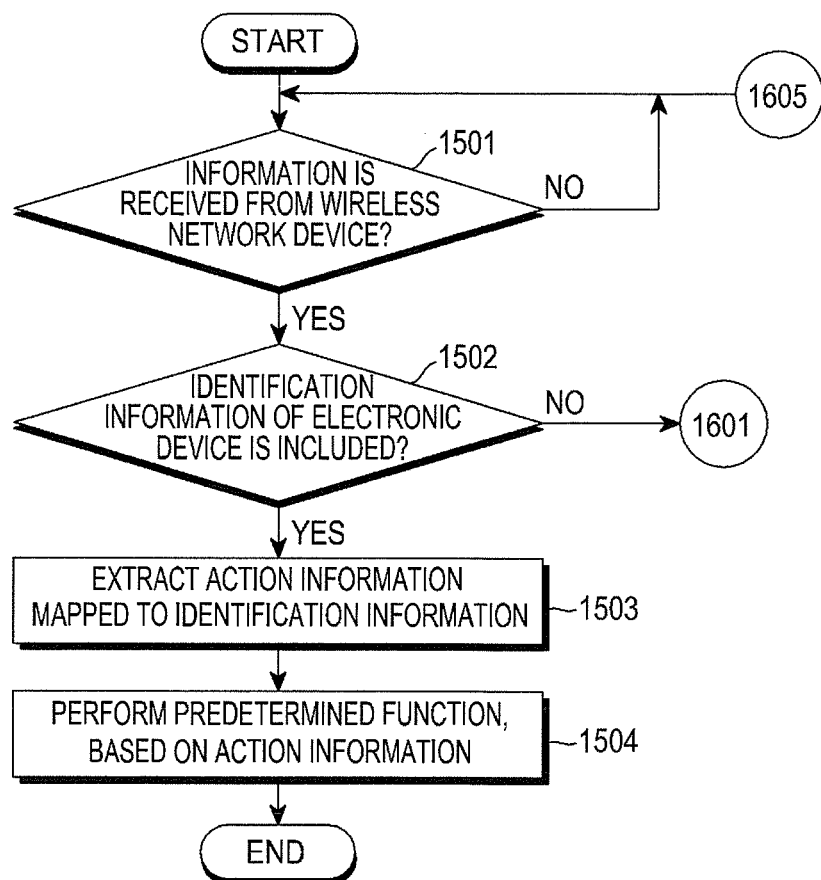
FIG. 15 is a flowchart illustrating a method of providing LBS by using identification information according to an embodiment of the present disclosure.

FIG. 15 illustrates a method of providing LBS by using identification information according to an embodiment of the present disclosure. Referring to FIG. 15, if an electronic device 100 enters a service area, then it may determine if information on a wireless network device 200 installed in the service area is received from the wireless network device 200 (1501). When the result of the determination shows that information on the wireless network device 200 is received from the wireless network device 200, the electronic device

100 may proceed to the next operation. Alternatively, when the result of the determination shows that information on the wireless network device 200 is not received from the wireless network device 200, the electronic device 100 may proceed to operation 1605 as described below with reference to FIG. 16.

The electronic device 100 may determine if at least one piece of identification information transmitted by the electronic device 100 is included in the received information on the wireless network device 200 (1502). When the result of the determination shows that at least one piece of identification information transmitted by the electronic device 100 is included in the received information on the wireless network device 200, the electronic device 100 may proceed to the next operation. Alternatively, when the result of the determination shows that at least one piece of identification information transmitted by the electronic device 100 is not included in the received information on the wireless network device 200, the electronic device 100 may proceed to operation 1601 as described below with reference to FIG. 16.

When at least one piece of identification information transmitted by the electronic device 100 is included in the received information on the wireless network device 200, the electronic device 100 may extract at least one piece of action information mapped to the received identification information (1503). Action information may be mapped one-to-one or one-to-many to identification information, and the mapped identification information and action information may be stored in a table format in the memory 175 of the electronic device 100. The electronic device 100 may extract at least one piece of action information mapped to the received identification information from the memory 175.

Further, when at least one piece of action information mapped to the received identification information does not exist in the memory of the electronic device 100, the electronic device 100 may determine if at least one piece of action information transmitted by the electronic device 100 is included in the received information on the wireless network device 200. When the result of the determination shows that at least one piece of action information transmitted by the electronic device 100 is included in the received information on the wireless network device 200, the electronic device 200 may extract at least one piece of action information from the received information on the wireless network device 200 (1503).

The electronic device 100 may perform at least one function or execute at least one application predetermined for the electronic device 100, based on the extracted at least one piece of action information (1504).

Figure 16:
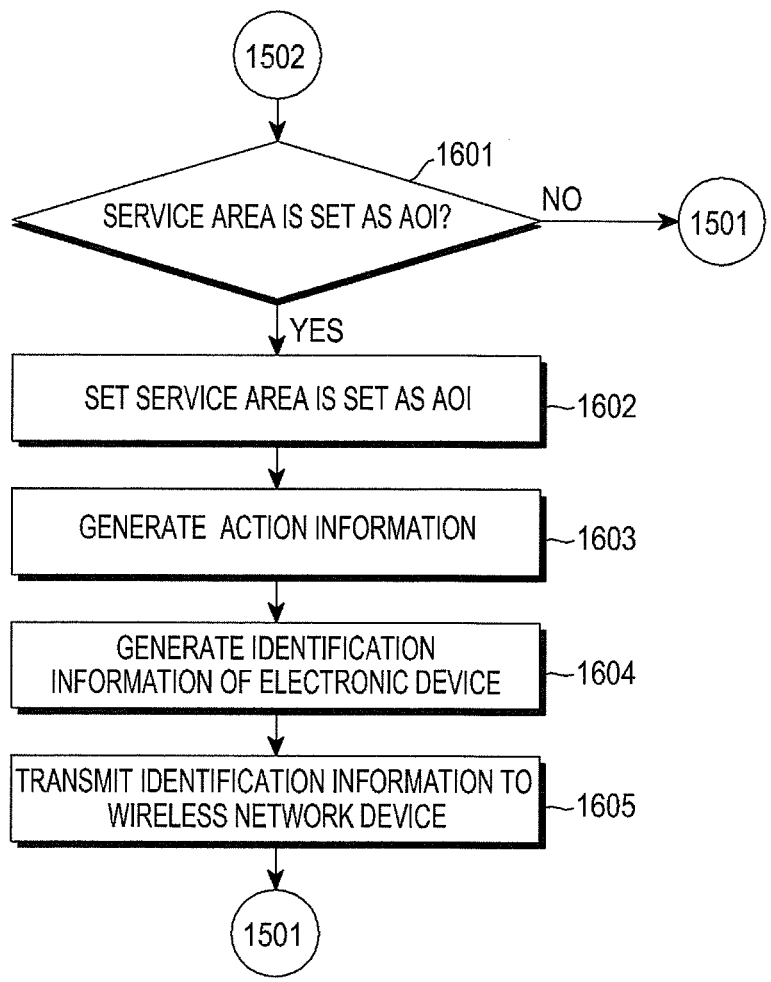
FIG. 16 is a flowchart illustrating a method of setting an area of interest to provide LBS according to an embodiment of the present disclosure.

FIG. 16 illustrates a method of setting an AOI to provide LBS according to an embodiment of the present disclosure. Referring to FIG. 16, when the result of the determination in operation 1502 described above with reference to FIG. 15 shows that at least one piece of identification information transmitted by the electronic device 100 is not included in the received information on the wireless network device 200, the electronic device 100 may proceed to operation 1601.

The electronic device 100 may receive an input value from a user, and based on the received input value, determine whether to set the service area, in which the electronic device 100 is currently located, as an AOI (1601). When the service area in which the electronic device 100 is currently located, is set as an AOI (1602), the electronic device 100 may proceed to the next operation 1603. Alternatively, when the service area in which the electronic device 100 is currently located, is not set as an AOI, the electronic device 100 may proceed to operation 1501 described above with reference to FIG. 15 and wait again to receive information on the wireless network device 200 from the wireless network device 200.

If the service area in which the electronic device 100 is currently located, is set as an AOI, then the electronic device 100 may generate at least one piece of action information (1603).

Once at least one piece of action information is generated, the electronic device 100 may generate at least one piece of identification information to be mapped to the generated at least one piece of action information (1604). The generated at least one piece of identification information may be mapped to the generated at least one piece of action information, and the mapped identification information and action information may be stored in the memory 175.

Further, operations 1603 and 1604 are not limited in temporal order and may be performed in reverse order. The electronic device 100 may also generate at least one piece of identification information and then generate at least one piece of action information to be mapped to the generated identification information.

The electronic device 100 may transmit the generated at least one piece of identification information to the wireless network device 200 (1605). Subsequently, the electronic device 100 may wait again to receive information on the wireless network device 200 from the wireless network device 200. As another example, the electronic device 100 may transmit the generated at least one piece of identification information and at least one piece of action information mapped to the at least one piece of identification information to the wireless network device 200.

The method and electronic device for providing LBS according to the embodiments of the present disclosure as described above may be implemented in the form of program commands executable through various computer means to be recorded in a computer readable recording medium. The computer readable recording medium may include only program commands, data files, or data structures, or may include a combination thereof. The program commands recorded in the computer readable recording medium may be those specifically designed for embodiments of the present disclosure or well-known to and usable by those skilled in the computer software art. Examples of the computer readable recording medium may include magnetic media such as a hard disk, a floppy disk, and a magnetic tape, optical media such as a compact disk-read only memory (CD-ROM) and a digital video disk (DVD)-ROM, magneto-optical media such as a floptical disk, and hardware devices specially designed to store and execute program commands, such as a ROM, a random access memory (RAM), and a flash memory. Further, this recording medium may store and execute codes that are distributed over a computer system connected via a network and readable by a computer in a distributed manner. Examples of the program commands may include not only machine language codes generated by a complier, but also high-level language codes executable by a computer by using an interpreter and the like. The hardware devices may be designed to be operated as one or more software modules to perform the operations of the inventive method, and vice versa.

FIGS. 17A through 17E illustrate examples of utilizing a method of providing LBS by using identification information according to an embodiment of the present disclosure.

Referring to FIG. 17A, if an electronic device 100 enters a service area, then the electronic device 100 may display the message "Register AOI" (1700) on the screen so as to store the current service area as an AOI. The electronic device 100 may determine whether to set the service area, in which the electronic device 100 is currently located, as an AOI according to a user's selection. When a user selects "Yes" (1701), the electronic device 100 may set the service area, in which the electronic device 100 is currently located, as an AOI and proceed to the next operation. Alternatively, when the user selects "No" (1702), the electronic device 100 may terminate the LBS.

Referring to FIG. 17B, if the service area, in which the electronic device 100 is currently located, is set as an AOI, then the electronic device 100 may display the wireless network device list (1703), which includes the network names of at least one wireless network device 200 currently connectable to the electronic device 100, on the screen. According to the user's selection, the electronic device 100 may set the wireless network device 200 to be connected to the electronic device 100 when the electronic device 100 enters the service area set as an AOI. As an example, if the user selects the name of the second wireless network device located at the user's home, then the electronic device 100 may set the second wireless network device as the wireless network device to be used when the electronic device 100 enters the service area set as an AOI.

Referring to FIG. 17C, the electronic device 100 may generate at least one piece of action information and display the action information setting list (1704). According to the user's selection, the electronic device 100 may set the at least one piece of action information to be performed by the electronic device 100 when the electronic device 100 enters the service area which is set as an AOI and in which the electronic device 100 is currently located. As an example, the user may select "Music Playback" and "Company's Call Rejection Mode" from the action information setting list (1704) and then select "Complete" (1705) to thereby set the at least one action information to be performed by the electronic device 100.

Referring to FIG. 17D, the electronic device 100 may display the message "AOI Registration Is Completed!" (1706), which indicates that the service area in which the electronic device 100 is currently located has been registered as an AOI according to the user's selection, on the screen.

Referring to FIG. 17E, when the electronic device 100 reenters the AOI, the fact that the electronic device 100 currently enters the AOI and the message for determining whether to perform the registered action information are displayed on the screen. As an example, if the user selects "Run" (1709), then the electronic device 100 may perform at least one function or execute at least one application, based on the registered at least one piece of action information.

Further, if the user selects "Change" (1708), then the electronic device 100 may perform any one of the operations shown in FIG. 17A to FIG. 17D again.

Further, the electronic device 100 may generate a plurality of pieces of identification information and map at least one piece of action information to each of the generated identification information. As an example, action information "Music Playback" may be mapped to first identification information, and action information "Company's Call Rejection Mode" may be mapped to second identification information. If the user selects "Change" (1708), then the electronic device 100 may selectively perform a desired one of the registered two pieces of action information.

Further, if the user selects "Reject" (1710), then the electronic device 100 may terminate the LBS.

Further, the electronic device 100 may omit at least one of the operations of FIG. 17A to FIG. 17E or perform the operations in transposed order. As an example, the operation of registering an AOI and the operation of setting action information may be performed in reverse order.

Information on a wireless network device as described in various embodiments of the present disclosure may include identification information of at least one electronic device. Further, information on a wireless network device may include identification information of an electronic device and at least one piece of action information mapped to the identification information. Identification information of an electronic device is not limited to identification information transmitted to a wireless network device by the electronic device. A way for a wireless network device to acquire identification information of an electronic device includes the following examples and embodiments.

Identification information of an electronic device, included in information on a wireless network device, may be generated based on identification information of the electronic device, which the wireless network device receives from the electronic device.

Further, identification information of an electronic device, included in information on a wireless network device, may be generated based on identification information of the electronic device, which the wireless network device receives from any other wireless network device. The any other wireless network device already stores the identification information of the electronic device.

Further, identification information of an electronic device, included in information on a wireless network device, may be generated based on identification information of the electronic device, which the wireless network device receives from any one of a plurality of electronic devices that provide LBS by using identification information of a single sign on type. The plurality of electronic devices already store the identification information of the electronic device.

As described above, although the present disclosure has been described through the specific matters such as detailed elements, limited embodiments, and drawings, they are provided to help overall comprehension of the present disclosure, and the present disclosure is not limited to the above-described embodiments. It is obvious to those skilled in the art to which the present disclosure pertains that various changes and modifications can be made from such descriptions as described above.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing location-based services (LBS) of an electronic device, the method comprising:
   receiving information from a wireless network device when the electronic device enters a service area of the wireless network device, wherein the information stored in the wireless network device includes identification information of at least one external electronic device of the wireless network device;
   determining whether identification information of the electronic device is included in the received information; and in response to a result of the determination, performing at least one function of the electronic device based on at least one piece of action information, wherein the action information is included in the received information or is stored information in the electronic device, wherein, when the electronic device enters the service area of the wireless network device, the method is further comprising:

determining whether the service area corresponds to an area of interest (AOI) stored in the electronic device, and registering the service area of the wireless network device as the AOI based on a user input, if the service area of the wireless network device does not correspond to AOI stored in the electronic device.

2. The method of claim 1, wherein performing the at least one function of the electronic device further comprises performing at least one predetermined function of the electronic device, the at least one predetermined function corresponding to the identification information.

3. The method of claim 1, wherein, determining whether the identification information of the electronic device is included in the received information further comprises at least one of a serial number, media access control (MAC) address, universally administered address (UAA), locally administered address (LAA), Internet protocol (IP) address, international mobile equipment identity (IMEI), international mobile station identity (IMSI), temporary mobile subscriber identity (TMSI), mobile identification number (MIN), mobile station international subscriber directory number (MSISDN), single sign on ID, or personal identification number (PIN) of the electronic device is used as the identification information of the electronic device, or identification information that is newly generated based on at least one thereof is used as the identification information of the electronic device.

4. The method of claim 1, wherein the at least one piece of action information corresponds to the identification information.

5. The method of claim 1, further comprises: generating the identification information and the action information into one message using at least one of a bit operation, a simple operation, encoding, or compression.

6. The method of claim 1, wherein determining whether the identification information of the electronic device is included in the received information further comprises determining whether the identification information corresponding to a plurality of electronic devices is included in the received information.

7. The method of claim 1, further comprising:
transmitting the identification of the electronic device to the wireless network device; and
transmitting the at least one piece of action information to the wireless network device, wherein the at least one piece of action information is mapped to the identification information of the electronic device.

8. A method for providing location-based services (LBS) of a wireless network device, the method comprising:
receiving identification information of an electronic device and at least one action information, wherein the at least one action information is received by the electronic device that enters a service area of the wireless network device, and wherein the service area of the wireless network device is stored as an area of interest (AOI) in the electronic device;

generating, on the wireless network device, information including the identification information of the electronic device; and transmitting the generated information including the identification information of the electronic device using a broadcast scheme.

9. The method of claim 8, wherein receiving the identification information of the electronic device further comprises:
receiving the identification information of the electronic device from another wireless network device in which the identification information of the electronic device is stored;
receiving the identification information of the electronic device directly from the electronic device; or
receiving the identification information of the electronic device from at least one of a plurality of electronic devices using a single sign on function.

10. The method of claim 8, wherein generating the information on the wireless network device further comprises:
generating the information on the wireless network device based on the identification information of the electronic device; and
generating the information on the wireless network device based on the identification information of the electronic device and at least one piece of action information mapped to the identification information of the electronic device.

11. A non-transitory computer readable medium encoded with computer-executable instructions that when executed cause a processor to cause an electronic device to:
receive information from a wireless network device when the electronic device enters a service area of the wireless network device, wherein the information stored in the wireless network device includes identification information of at least one external electronic device of the wireless network device;
determine whether identification information of the electronic device is included in the received information; and
in response to a result of the determination, perform at least one function of the electronic device based on at least one piece of action information, wherein the action information is included in the received information or is stored information in the electronic device,
wherein, when the electronic device enters the service area of the wireless network device, the processor is further causing the electronic device to:
determine whether the service area corresponds to an area of interest (AOI) stored in the electronic device, and
register the service area of the wireless network device as the AOI based on a user input, if the service area of the wireless network device does not correspond to AOI stored in the electronic device.

12. A non-transitory computer readable medium encoded with computer-executable instructions that when executed cause a processor to cause a wireless network device to:
receive identification information of an electronic device and at least one action information, wherein the at least one action information is received by the electronic device that enters a service area of the wireless network device, and wherein the service area of the wireless network device is stored as an area of interest (AOI) in the electronic device;

generate, on the wireless network device, information including the identification information of the electronic device; and transmit the generated information including the identification information of the electronic device using a broadcast scheme.

13. An electronic device for providing location-based services (LBS), the electronic device comprising:
a communication interface configured to receive, from a wireless network device, information stored in a wireless network device including identification information of at least one electronic device of the wireless network device when the electronic device enters a service area of the wireless network device; and
a controller configured to perform at least one function of the electronic device based on at least one piece of action information when the identification information is included in the received information,
wherein, the action information is included in the received information or is stored information in a memory of the electronic device,
wherein, when the electronic device enters the service area of the wireless network device, the controller is further configured to:
determine whether the service area corresponds to an area of interest (AOI) stored in the electronic device, and
register the service area of the wireless network device as the AOI based on a user input, if the service area of the wireless network device does not correspond to AOI stored in the electronic device.

14. The electronic device of claim 13, wherein the controller is further configured to use at least one of a serial number, media access control (MAC) address, universally administered address (UAA), locally administered address (LAA), Internet protocol (IP) address, international mobile equipment identity (IMEI), international mobile station identity (IMSI), temporary mobile subscriber identity (TMSI), mobile identification number (MIN), mobile station international subscriber directory number (MSISDN), single sign on ID, or personal identification number (PIN) of the electronic device as the identification information of the electronic device, or identification information newly generated based on at least one thereof as the identification information of the electronic device.

15. The electronic device of claim 13, wherein the at least one function of the electronic device includes at least one of application execution, application termination, changes in settings of the electronic device, user interface changes, screen switching, interruption of a specific function of the electronic device, message forwarding, message reception, or alert message popup window display.

16. The electronic device of claim 13, wherein the controller is further configured to transmit at least one of the identification information of the electronic device or the at least one piece of action information to the wireless network device.

17. The electronic device of claim 13, the at least one piece of action information mapped to the identification information of the electronic device.

18. The electronic device of claim 13, wherein the memory further configured to store at least one of the identification information or the identification information and the at least one piece of action information mapped to the identification information.

19. The electronic device of claim 13, wherein the identification information is shared among a plurality of electronic devices or corresponds to each of the identification information of the plurality of electronic devices.

20. The electronic device of claim 13, wherein the controller is further configured to:
transmit the identification information of the electronic device to the wireless network device; or
transmit, to the wireless network device, the identification information of the electronic device and the at least one piece of action information mapped to the identification information of the electronic device based on the user input.

* * * * *